US010172319B2

(12) United States Patent
Hayes et al.

(10) Patent No.: US 10,172,319 B2
(45) Date of Patent: Jan. 8, 2019

(54) INLINE ANALYZER FOR A MILKING MACHINE

(71) Applicant: Guardian Research Technologies, LLC, Amarillo, TX (US)

(72) Inventors: Roger Hayes, Amarillo, TX (US); Daniel McCabe, Amarillo, TX (US); Robert Mills, Amarillo, TX (US); Shannon Lance Warren, Amarillo, TX (US); Teresa Hayes, Amarillo, TX (US)

(73) Assignee: GUARDIAN RESEARCH TECHNOLOGIES, LLC, Amarillo, TX (US)

( * ) Notice: Subject to any disclaimer, the term of this patent is extended or adjusted under 35 U.S.C. 154(b) by 0 days.

(21) Appl. No.: 16/018,612

(22) Filed: Jun. 26, 2018

(65) Prior Publication Data
US 2018/0303055 A1  Oct. 25, 2018

Related U.S. Application Data

(62) Division of application No. 15/101,508, filed as application No. PCT/US2014/068247 on Dec. 3, 2014, now Pat. No. 10,004,204.
(Continued)

(51) Int. Cl.
G08B 23/00 (2006.01)
A01J 5/01 (2006.01)
(Continued)

(52) U.S. Cl.
CPC .............. *A01J 5/01* (2013.01); *A01J 5/007* (2013.01); *A01J 5/013* (2013.01); *A01J 5/0135* (2013.01);
(Continued)

(58) Field of Classification Search
CPC .... A01J 5/01; A01J 5/007; A01J 5/013; A01J 5/0136; A01J 5/0138; A01J 5/0135;
(Continued)

(56) References Cited

U.S. PATENT DOCUMENTS 4,854,328 A   8/1989   Pollack
4,865,044 A   9/1989   Wallace et al.
(Continued)

OTHER PUBLICATIONS

International Search Report (PCT/US201/068247) dated Apr. 14, 2015.

*Primary Examiner* — Anh V La
(74) *Attorney, Agent, or Firm* — Daniel J. Chalker; Edwin S. Flores; Chalker Flores, LLP

(57) ABSTRACT

An inline analyzer for a milking machine system includes an outer body having a central axis, a fluid input channel, an upper cover attached to the fluid input channel, a central portion attached to the upper cover, a lower portion attached to the central portion, and a fluid output channel attached to the lower portion, wherein the fluid input channel, the central portion and the fluid output channel each have a hollow central channel. A float portion is disposed loosely within the outer body and is free to move axially along the central axis such that milk flows around the float portion. Electrode(s) extend through an upper portion of the float portion. A battery, processor(s), memory and actuator are disposed within float portion. The actuator causes the float portion to move axially along the outer body central to regulate the flow of milk through the outer body.

30 Claims, 27 Drawing Sheets

Related U.S. Application Data

(60) Provisional application No. 61/939,205, filed on Feb. 12, 2014.

(51) Int. Cl.
| | |
|---|---|
| *G06K 7/10* | (2006.01) |
| *A01J 7/00* | (2006.01) |
| *A01J 5/02* | (2006.01) |
| *A01J 5/013* | (2006.01) |
| *A01J 5/007* | (2006.01) |

(52) U.S. Cl.
CPC .......... *A01J 5/0136* (2013.01); *A01J 5/0138* (2013.01); *A01J 5/02* (2013.01); *A01J 7/00* (2013.01); *G06K 7/10366* (2013.01)

(58) Field of Classification Search
CPC ........ A01J 5/02; A01J 7/00; A01J 7/02; A01J 5/017; A01J 5/044; A01J 7/005; A01J 5/04; A01J 3/00; A01J 5/0133; G06K 7/10366
USPC ............. 340/573.3, 573.1; 119/14.02, 14.08, 119/14.14, 14.43, 14.4, 14.03, 14.18, 119/14.38, 14.44, 14.15
See application file for complete search history.

(56) References Cited

U.S. PATENT DOCUMENTS

| | | | |
|---|---|---|---|
| 5,792,964 A * | 8/1998 | van den Berg | A01J 5/01 73/861.15 |
| 5,794,646 A | 8/1998 | Perkins | |
| 5,897,304 A * | 4/1999 | Kaneko | F04B 9/1053 417/547 |
| 6,232,880 B1 | 5/2001 | Anderson et al. | |
| 7,830,257 B2 | 11/2010 | Hassell | |
| 7,975,647 B2 * | 7/2011 | Saho, III | A01J 5/007 119/14.38 |
| 8,567,345 B2 | 10/2013 | Kaever et al. | |
| 2002/0010390 A1 | 1/2002 | Guice et al. | |
| 2007/0159342 A1 | 7/2007 | Hixson | |
| 2007/0277737 A1 | 12/2007 | Maier et al. | |
| 2010/0302004 A1 | 12/2010 | Winstead et al. | |
| 2011/0017323 A1 * | 1/2011 | Herbst | A01J 5/007 137/551 |
| 2012/0132649 A1 | 5/2012 | Perkins et al. | |
| 2012/0298042 A1 * | 11/2012 | Hofman | A01J 5/013 119/14.02 |
| 2013/0087468 A1 | 4/2013 | Hoey | |

* cited by examiner

INLINE ANALYZER FOR A MILKING MACHINE

CROSS-REFERENCE TO RELATED APPLICATIONS

This patent application is a divisional application of U.S. patent application Ser. No. 15/101,508 filed on Jun. 3, 2016 now U.S. Pat. No. 10,004,204, which claims priority to US National Stage Patent Application of International Application Number PCT/US2014/068427 filed on Dec. 3, 2014, which claims the benefit under 35 U.S.C. 119(e) of US Provisional Patent Application Numbers 61/910,933 filed Dec. 2, 2013 and 61/939,205 filed Feb. 12, 2014.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

This disclosure relates generally to a data management system and method of use. None of the known inventions and patents, taken either singularly or in combination, is seen to describe the instant disclosure as claimed.

BRIEF SUMMARY OF THE INVENTION

A milking machine system includes one or more inline analyzers between a teat of an animal and a reservoir. Each inline analyzer includes an outer body and a float portion. The outer body has a central axis, a fluid input channel aligned with a central axis, an upper cover attached to the fluid input channel, a central portion aligned with the central axis and attached to the upper cover, a lower portion attached to the central portion, and a fluid output channel aligned with the central axis and attached to the lower portion. The fluid input channel, the central portion and the fluid output channel each have a hollow central channel. The float portion is disposed loosely within the hollow central channel of the central portion such that the float portion is free to move axially along the central axis and the flow of the milk within the outer body passes around the float portion. One or more sensors are positioned to detect one or more biological conditions of the milk or the animal. A battery is disposed within float portion. One or more processors are disposed within the float portion, communicably coupled to the one or more sensors and electrically connected to the battery. A memory is disposed within the float portion and communicably coupled to the one or more processors. An actuator is disposed within the float portion and operably connected to the one or more processors. The actuator causes the float portion to move axially along the central axis of the outer body to regulate the flow of the milk through the outer body in response to one or more signals from the one or more processors. The milking machine system analyzes the milk from the teat of the animal, and selectively disrupts the flow of the milk from a one or more of the one or more teats of the animal.

An inline analyzer for a milking machine system that regulates a flow of a milk from a teat into a reservoir includes an outer body and a float body. The outer body has a central axis, a fluid input channel aligned with a central axis, an upper cover attached to the fluid input channel, a central portion aligned with the central axis and attached to the upper cover, a lower portion attached to the central portion, and a fluid output channel aligned with the central axis and attached to the lower portion. The fluid input channel, the central portion and the fluid output channel each have a hollow central channel. The float portion is disposed loosely within the hollow central channel of the central portion such that the float portion is free to move axially along the central axis and the flow of the milk within the outer body passes around the float portion. One or more electrodes extend through an upper portion of the float portion. A battery is disposed within float portion. One or more processors are disposed within the float portion and electrically connected to the one or more electrodes and the battery. A memory is disposed within the float portion and communicably coupled to the one or more processors. An actuator is disposed within the float portion and operably connected to the one or more processors. The actuator causes the float portion to move axially along the central axis of the outer body to regulate the flow of the milk through the outer body in response to one or more signals from the one or more processors.

An ear tag for an animal includes a housing, an ear clip attached to the housing and a probe having a first end configured for placement within an ear canal of the animal and a second end attached to the housing. One or more processors are disposed within the housing and communicably coupled to the probe. A battery is disposed within the housing and electrically connected to the one or more processors. A radio frequency hardware is disposed within the housing and communicably coupled to the one or more processors. The one or more processors monitor one or more biological conditions of the animal using the probe and transmit one or more signals corresponding to the one or more biological conditions using the radio frequency hardware.

BRIEF DESCRIPTION OF THE SEVERAL VIEWS OF THE DRAWING

FIG. 3A illustrates said first analyzer fully assembled.

FIG. 3B illustrates said first analyzer in an exploded perspective overview with said outer body disassembled.

FIG. 3C illustrates a said first analyzer in an exploded perspective overview with said outer body and said float portion disassembled.

FIG. 3D illustrates an exploded perspective overview several components from within first analyzer without said outer body or said inner cell lower shell.

FIGS. 4A and 4B illustrate an elevated top view with cut lines and a perspective cross section overview of said first analyzer.

FIGS. 4C and 4D illustrate an elevated front view with cut lines and a perspective lower view of said first analyzer.

FIG. 4A comprises a first face, a second face and a third face, which are cut into said first analyzer as illustrated in FIG. 4B.

Figure 4A:
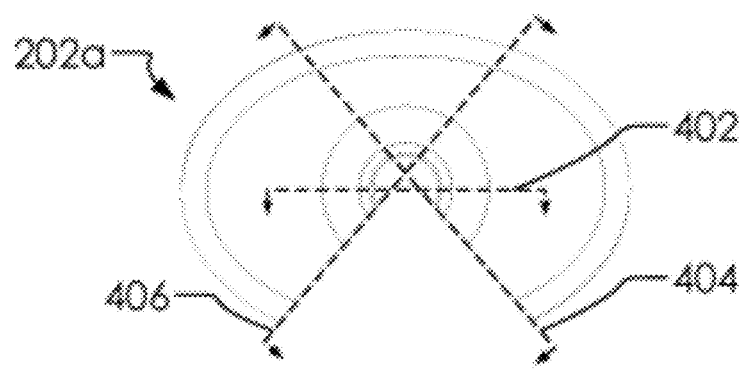
FIGS. 4A, 4B, 4C and 4D illustrate said various cross-section views of said first analyzer.
Figure 4B:
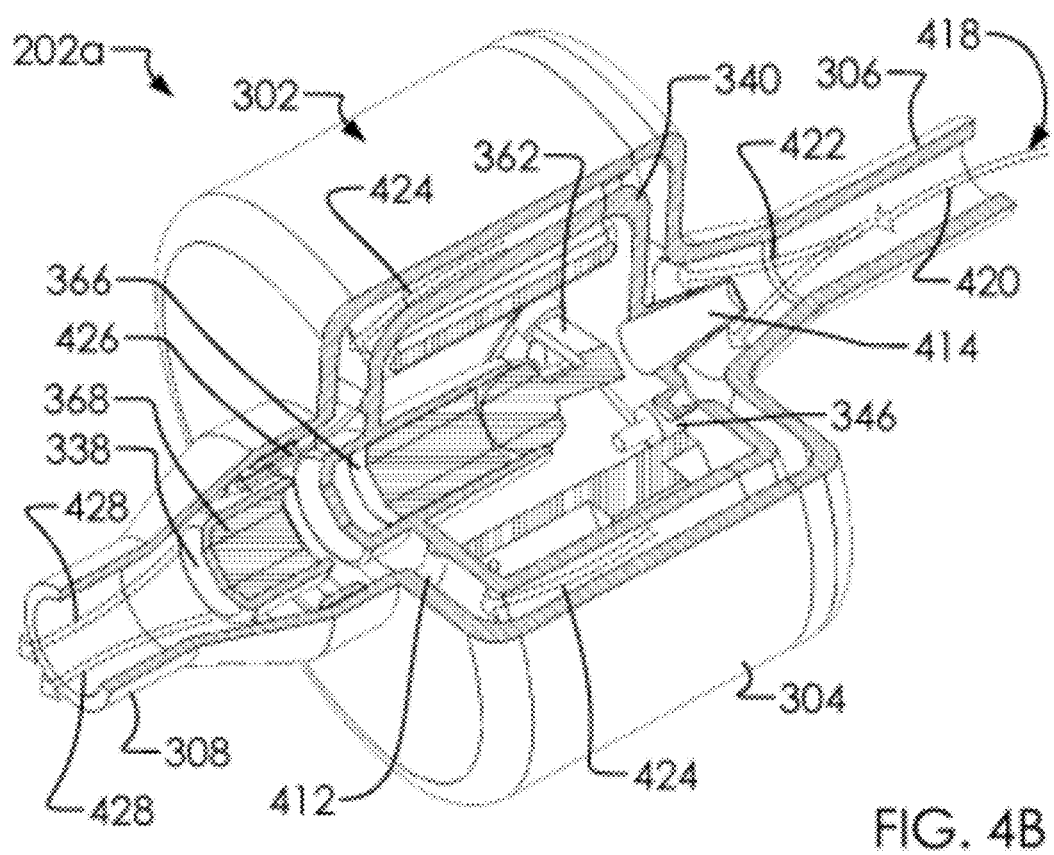
Figure 4C:
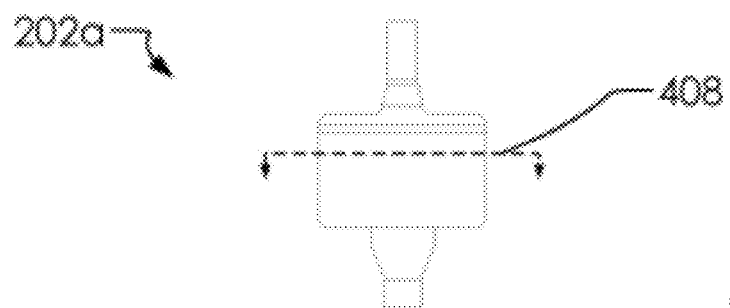
Figure 4D:
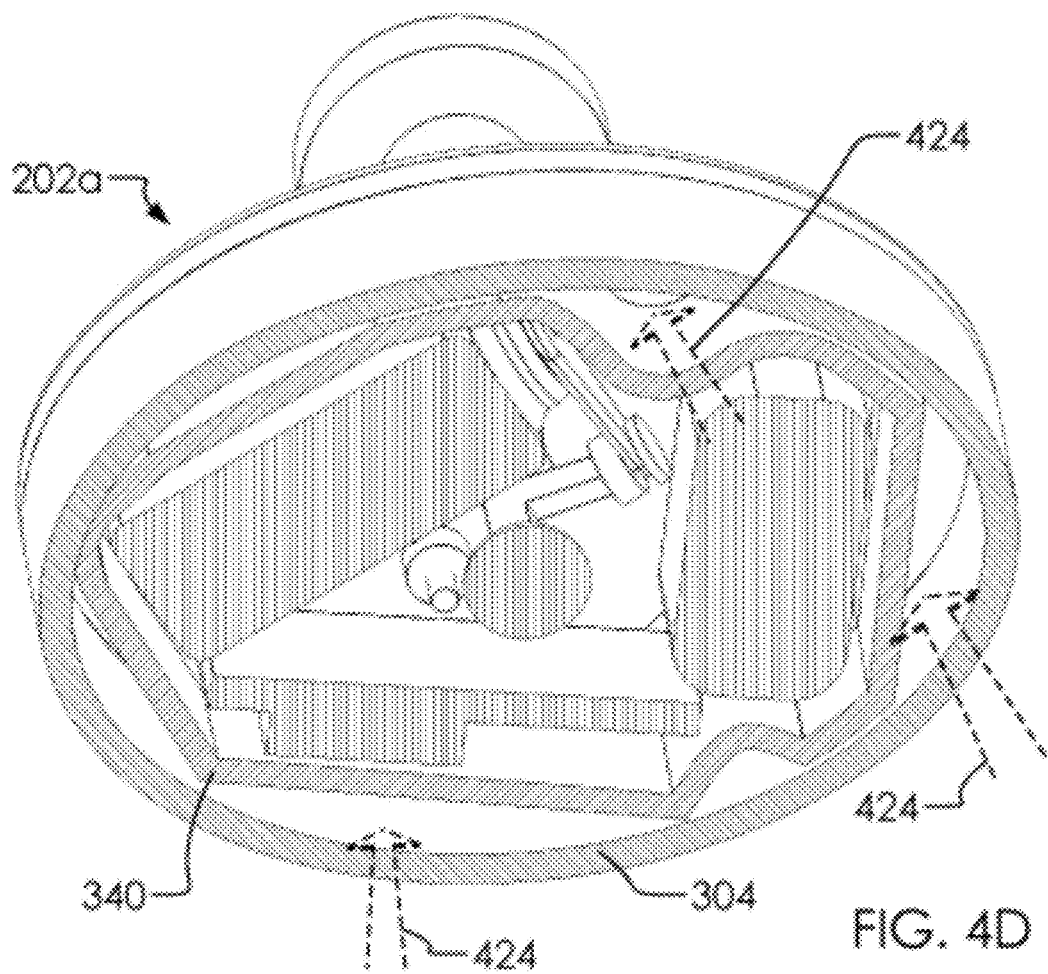

Likewise, FIG. 4C comprises a fourth face cut into said first analyzer as illustrated in FIG. 4D.

Figure 5A:
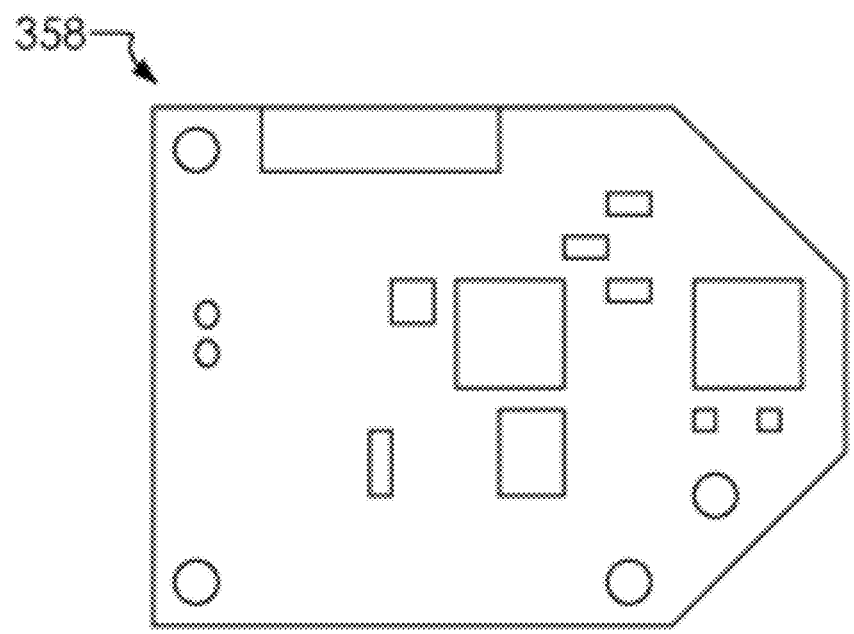
Figure 5B:
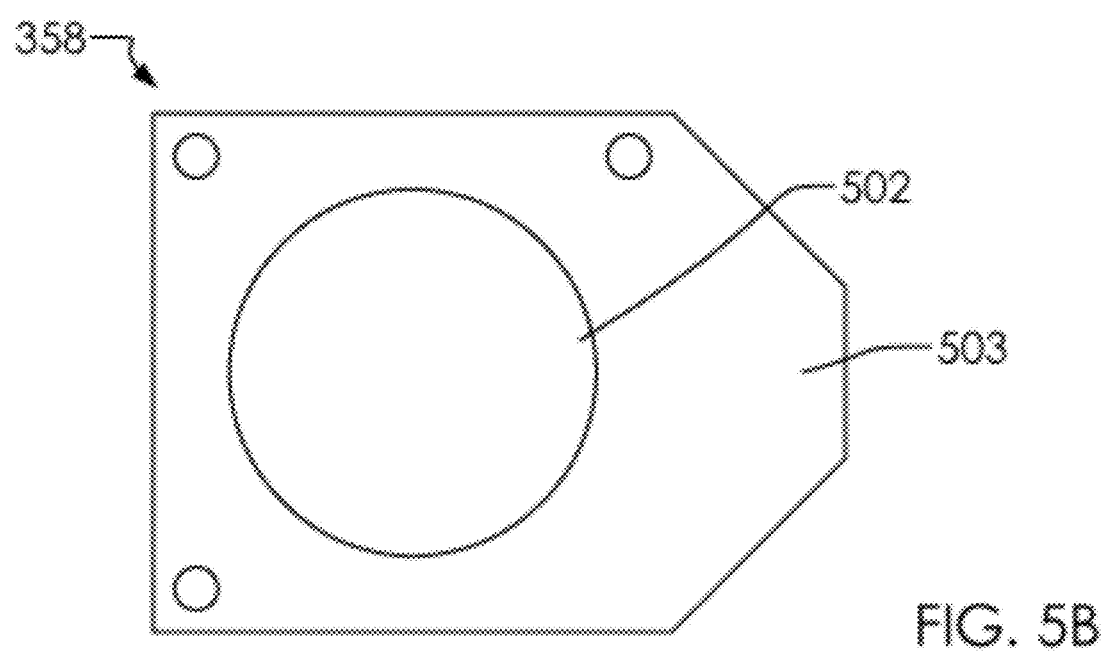

FIGS. 5A and 5B illustrate an elevated front view and an elevated back view of said system-on-a-chip.

Figure 5C:
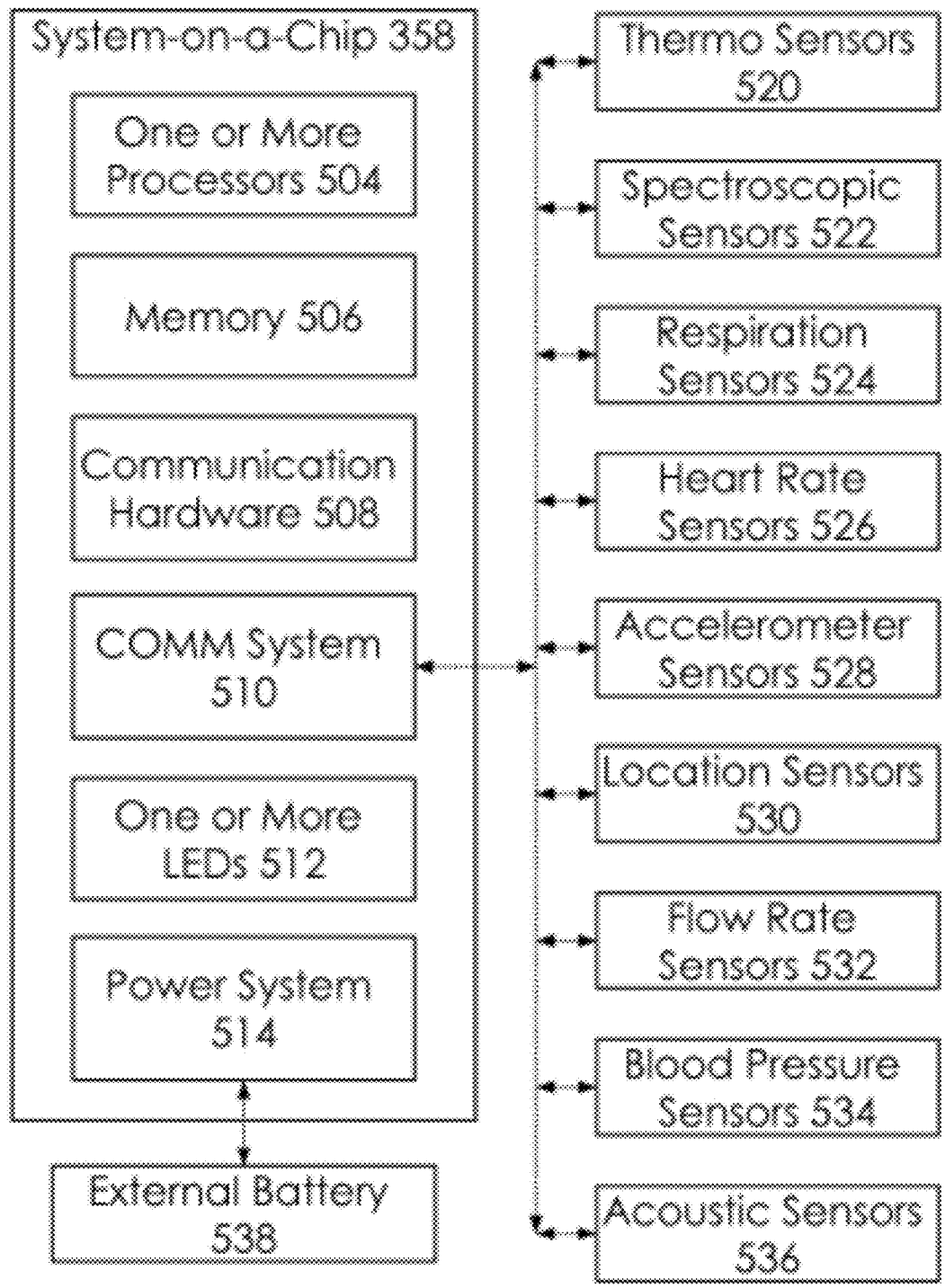

FIG. 5C illustrates a schematic of said system-on-a-chip 358.

Figure 6:
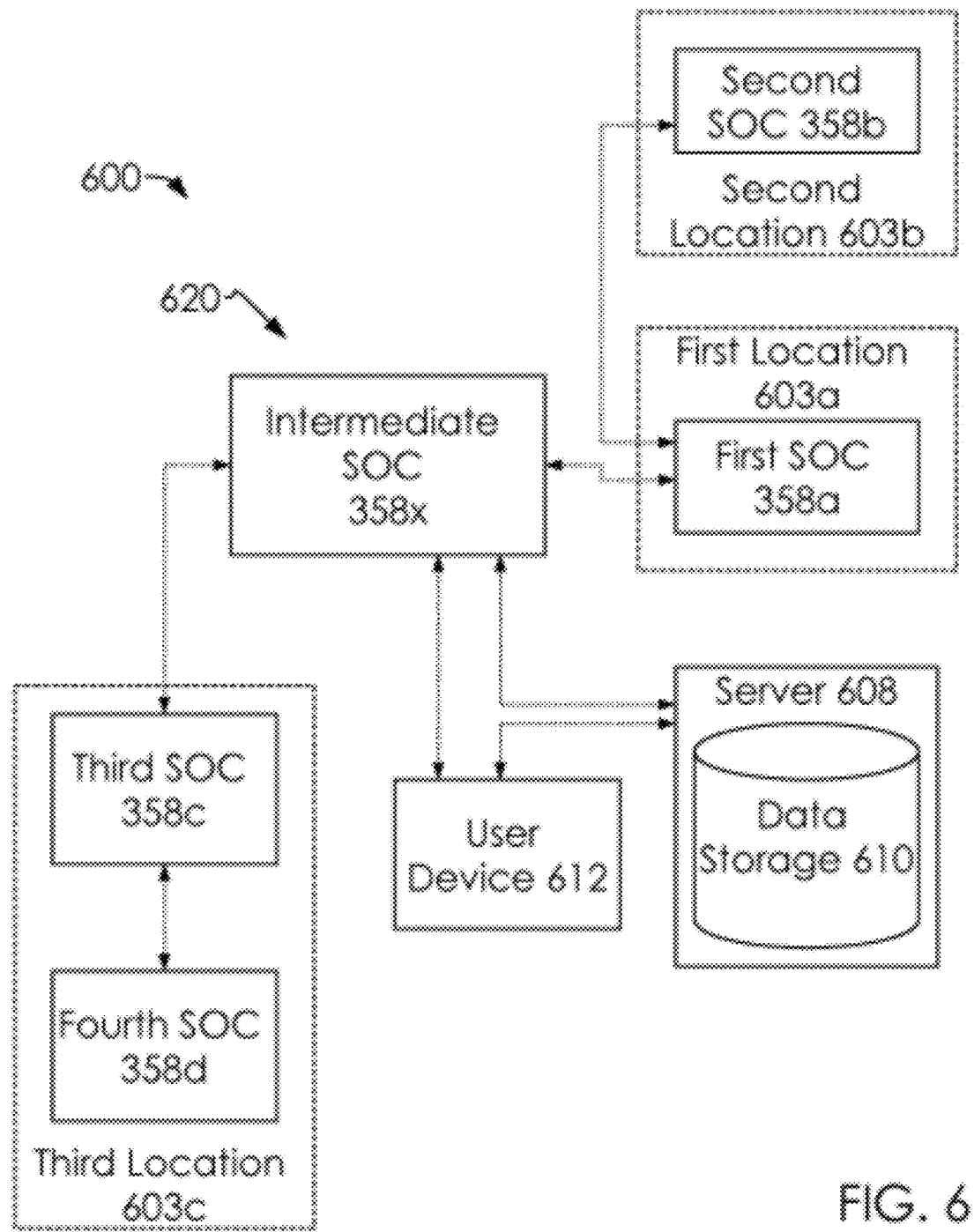

FIG. 6 illustrates a first network diagram of using said system-on-a-chip.

FIGS. 7 A, 7B, 7C and 7D illustrate a data flow diagram for said first network diagram of said plurality of SOCs.

Figure 8A:
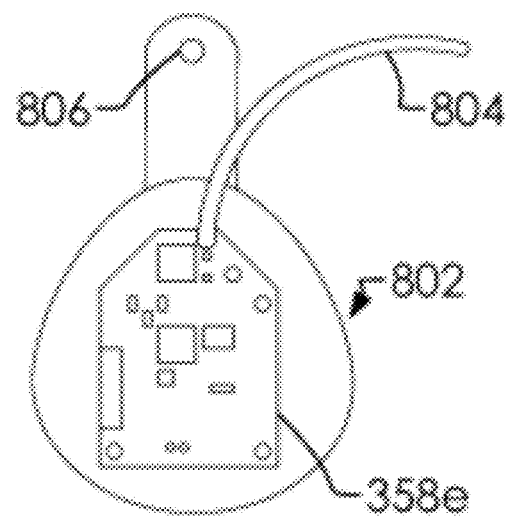
Figure 8B:
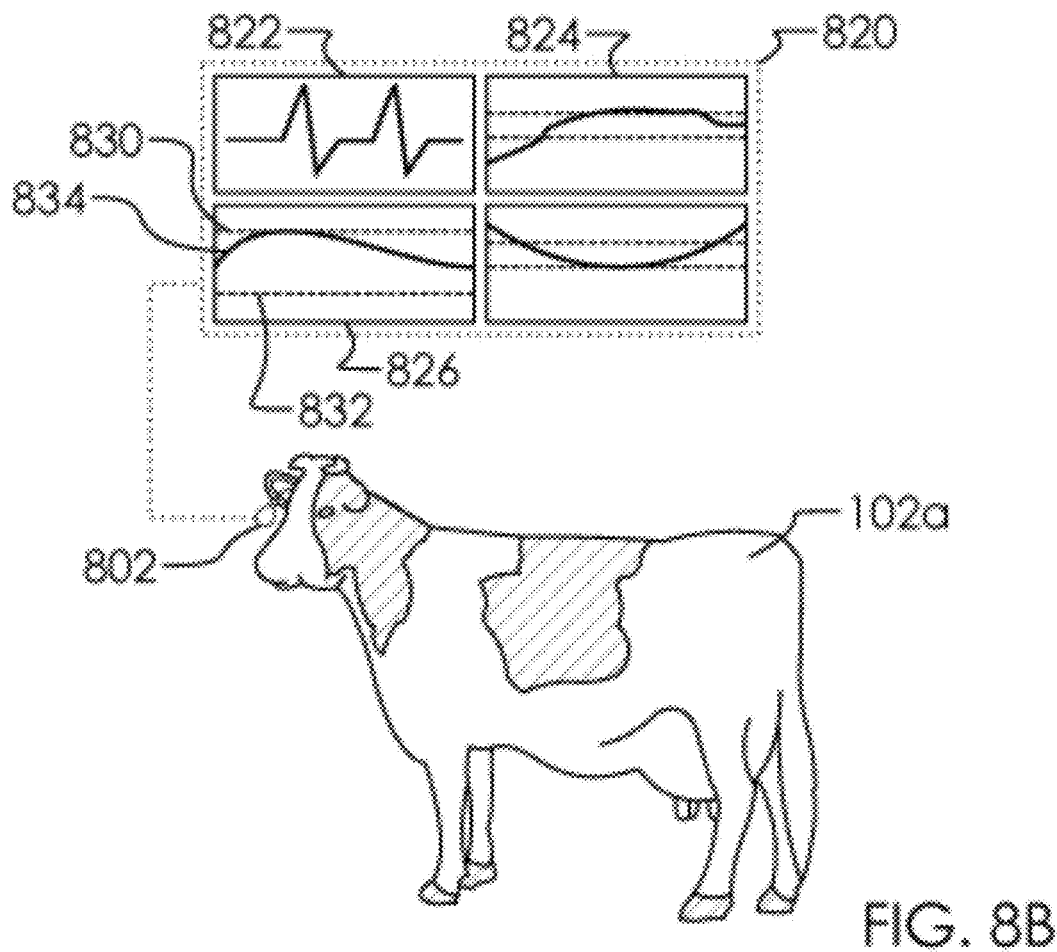

FIGS. 8A and 8B illustrate an elevated front view of an ear tag monitoring system comprising a fifth SOC, and an elevated front view of said ear tag monitoring system attached to said first animal.

Figure 9A:
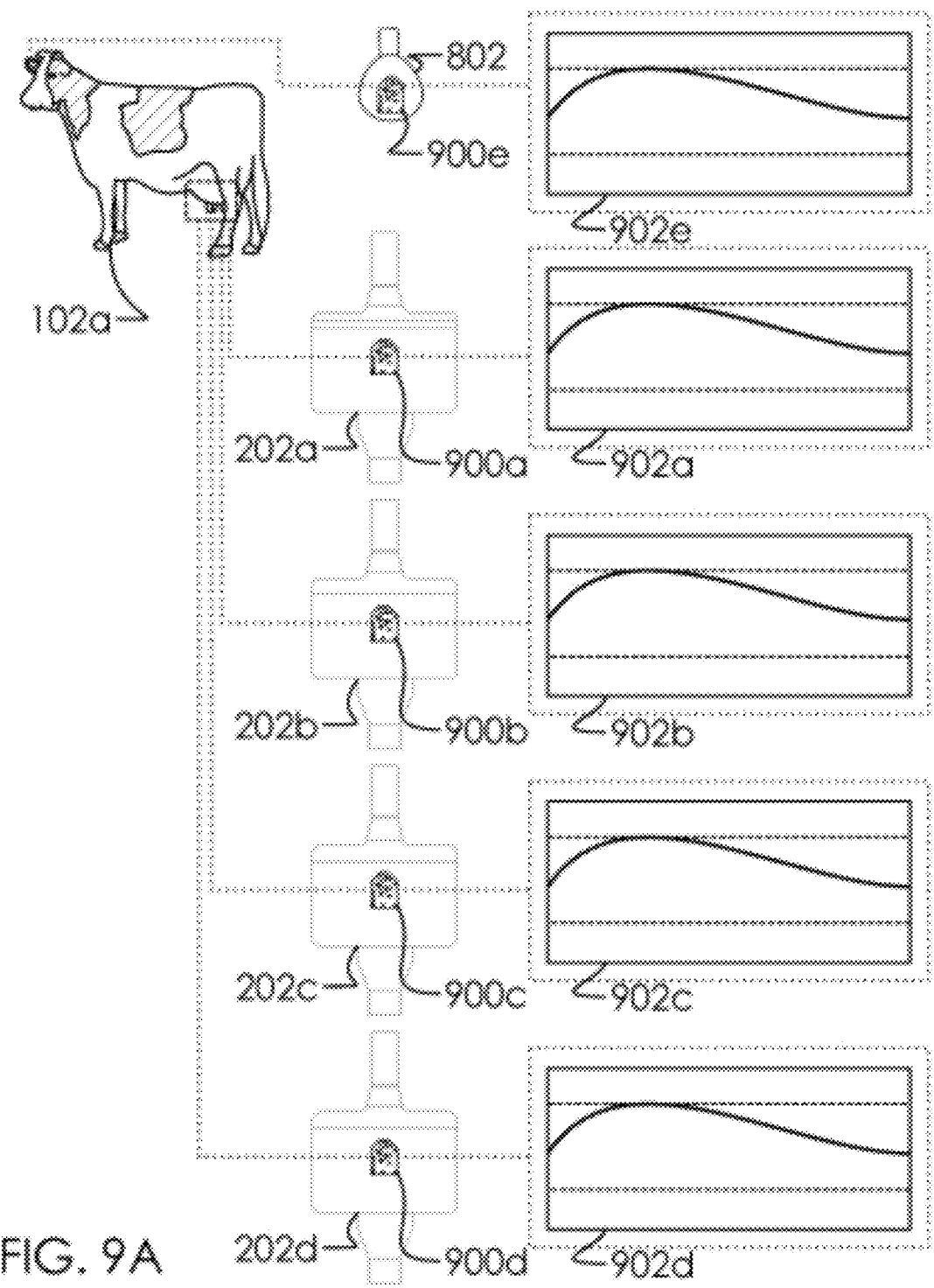
Figure 9B:
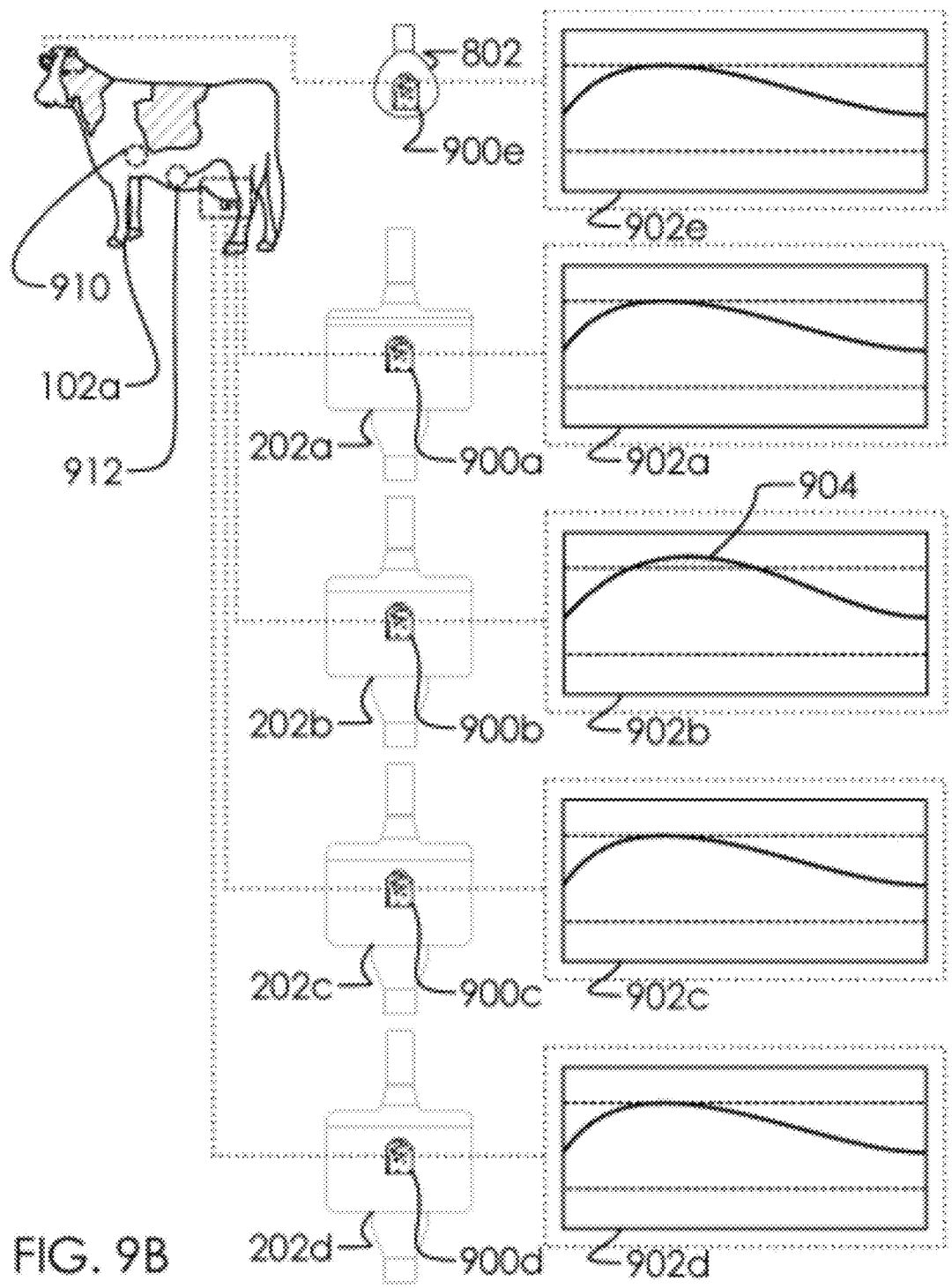

FIGS. 9A and 9B illustrate a first and second embodiment of a schematic of said one or more inline analyzers and said ear tag monitoring system attached to said first animal.

Figure 10A:
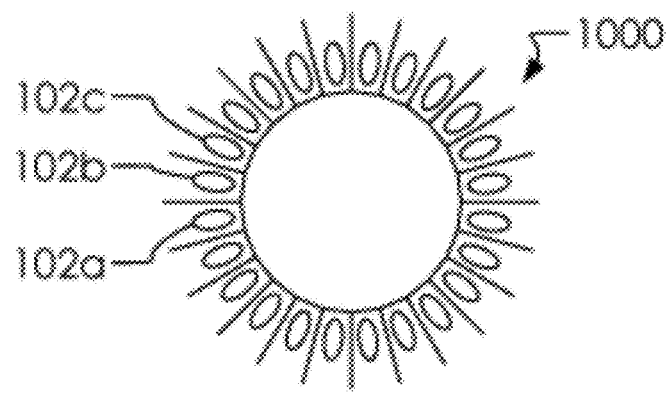
Figure 10B:
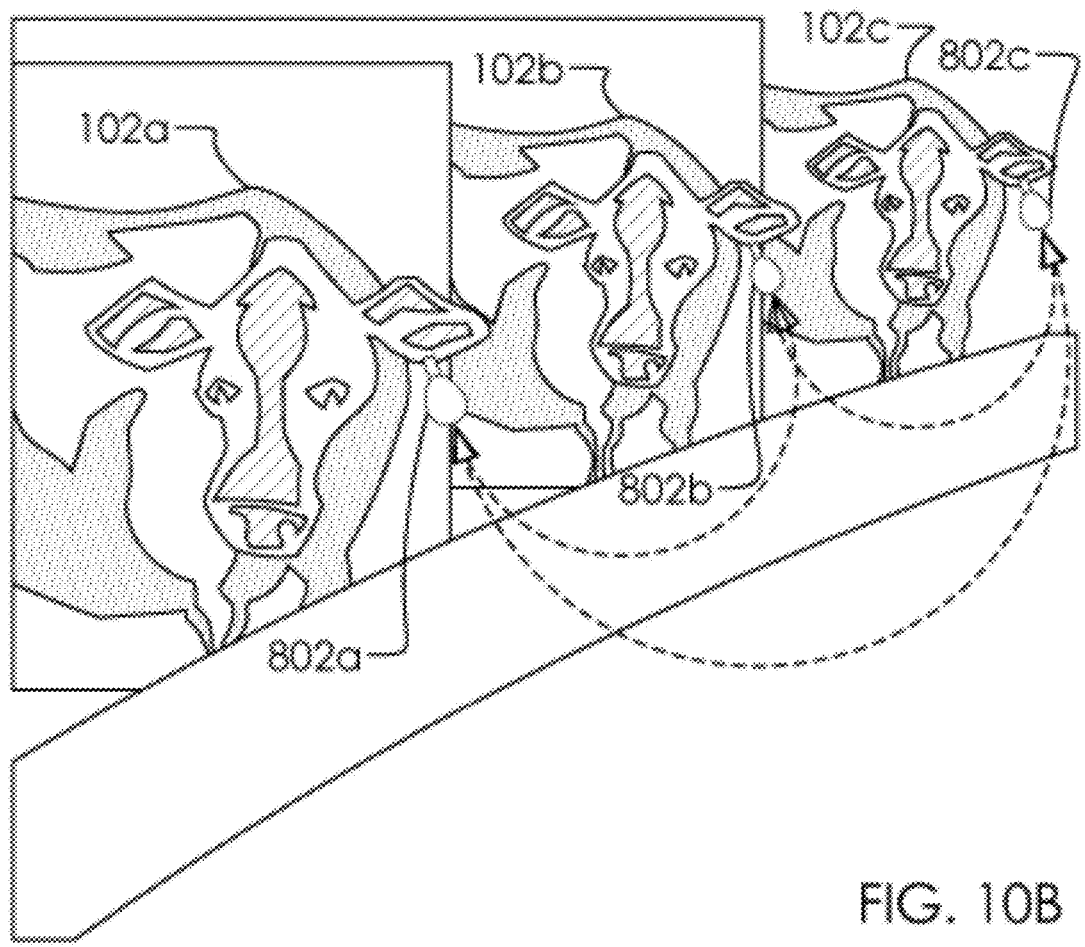

FIGS. 10A and 10B illustrate an elevated top view and a perspective overview of a one or more animals in a dairy milking system.

Figure 11A:
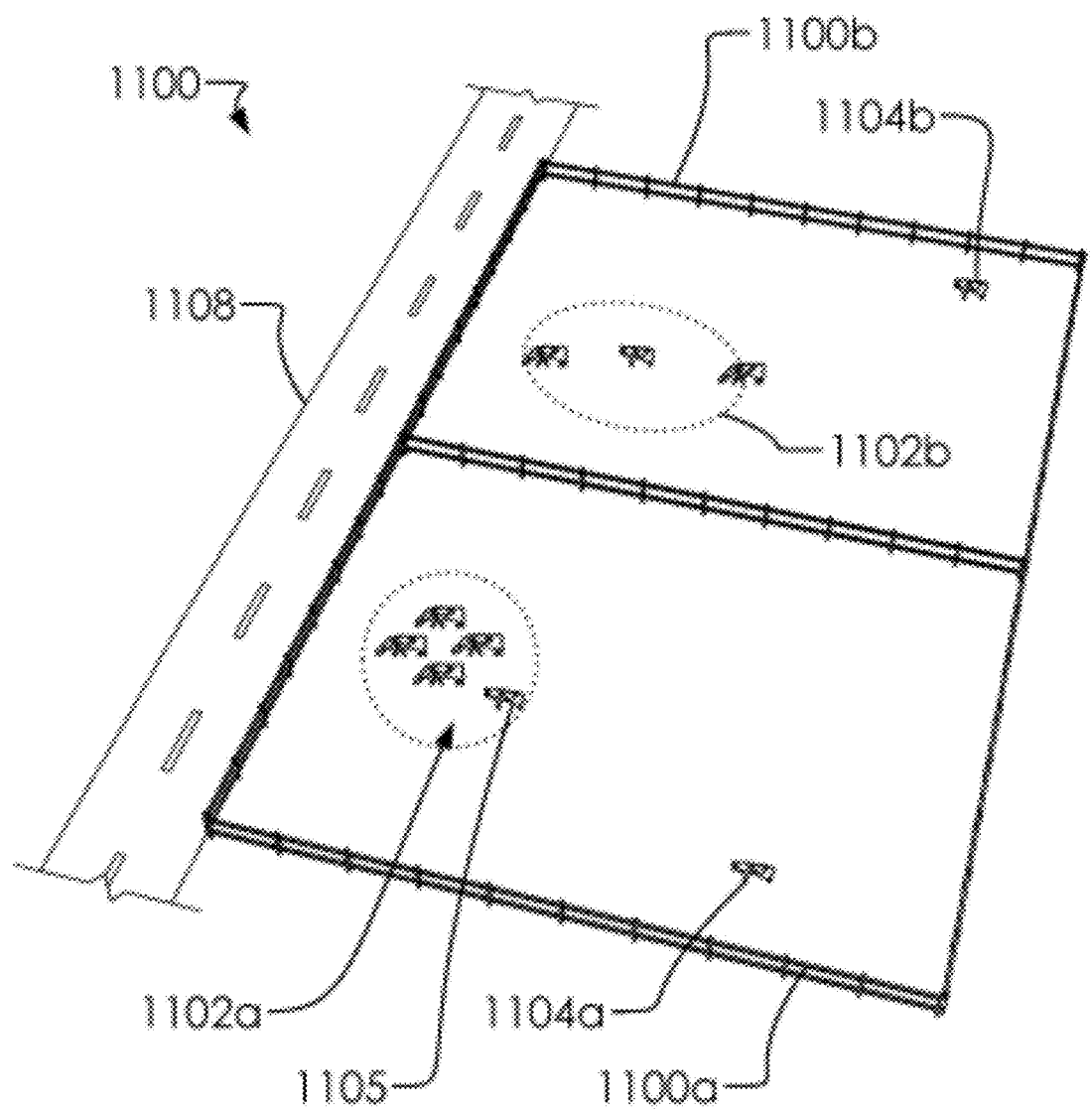
Figure 11B:
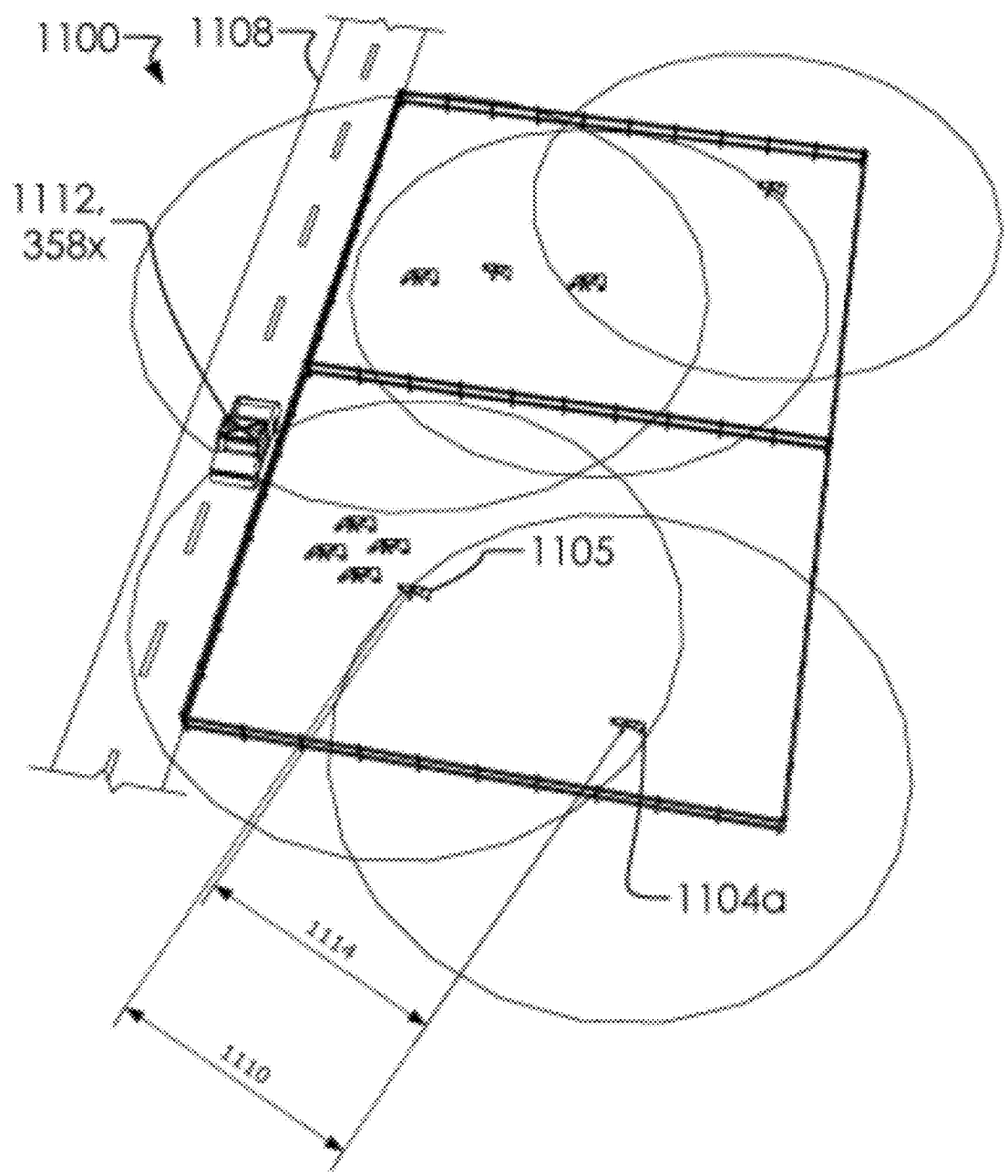

FIGS. 11A and 11B illustrate a perspective overview of a one or more pens 1100 with a one or more animals in a first pen 1100a and a second pen 1100b.

Figure 12A:
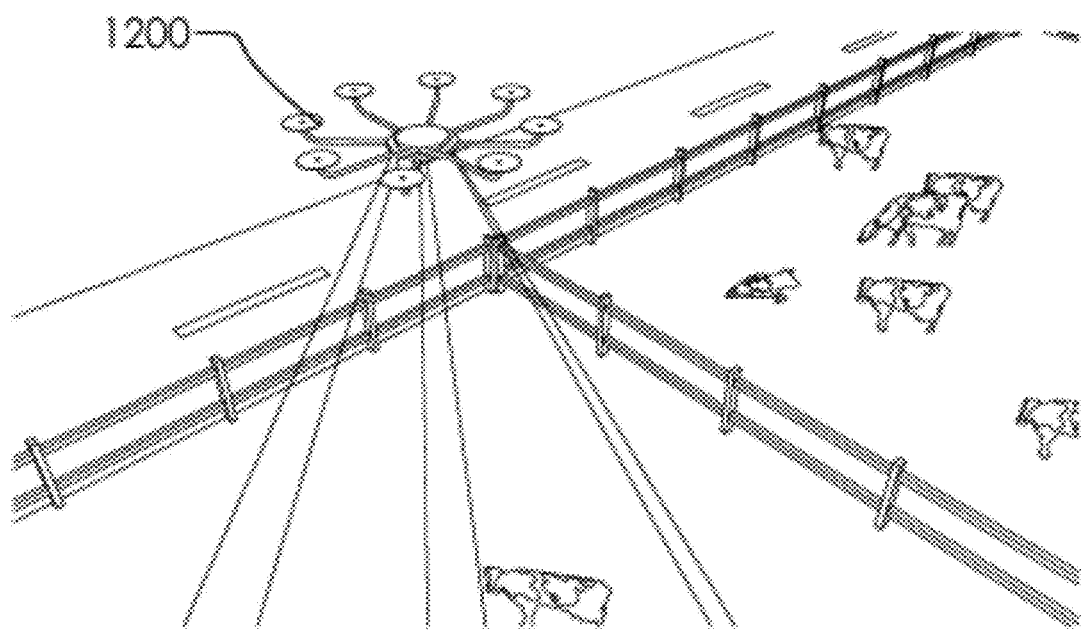
Figure 12B:
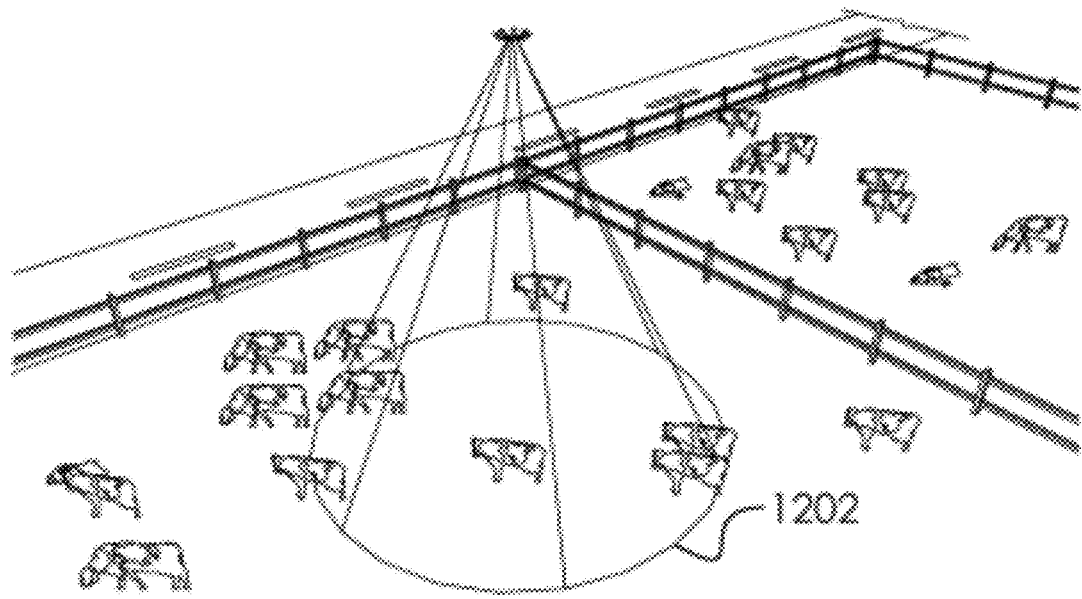

FIGS. 12A and 12B illustrate a perspective overview of an aerial intermediate SOC and an aerial SOC communication range.

Figure 13:
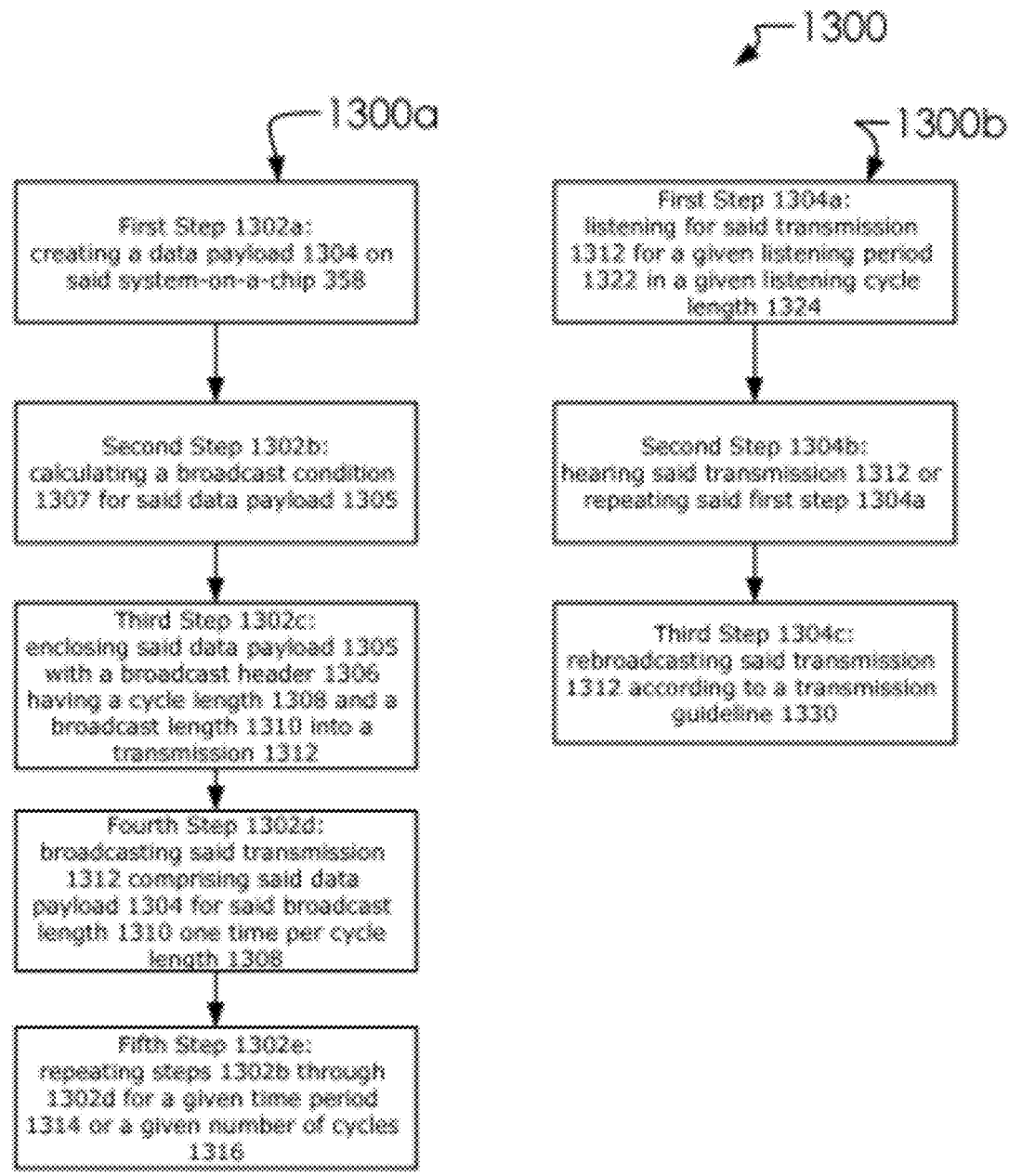

FIG. 13 illustrates a work flow diagram of a communications protocol 1300.

Figure 14A:
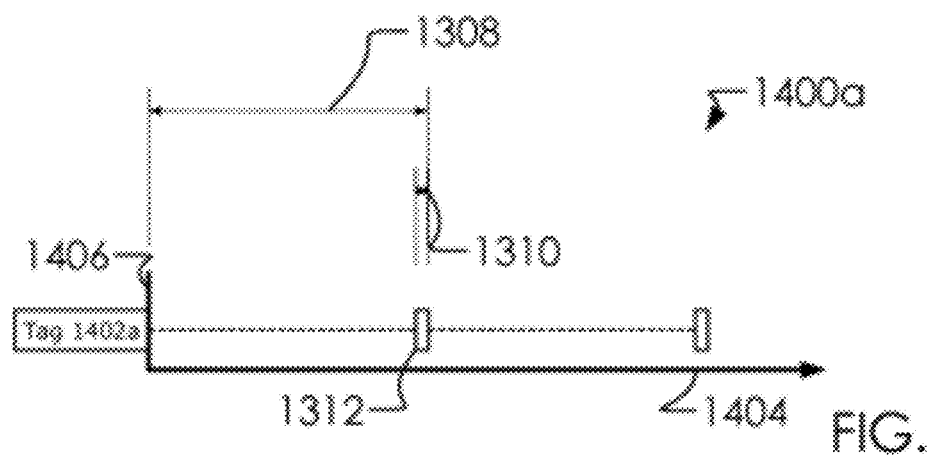
Figure 14B:
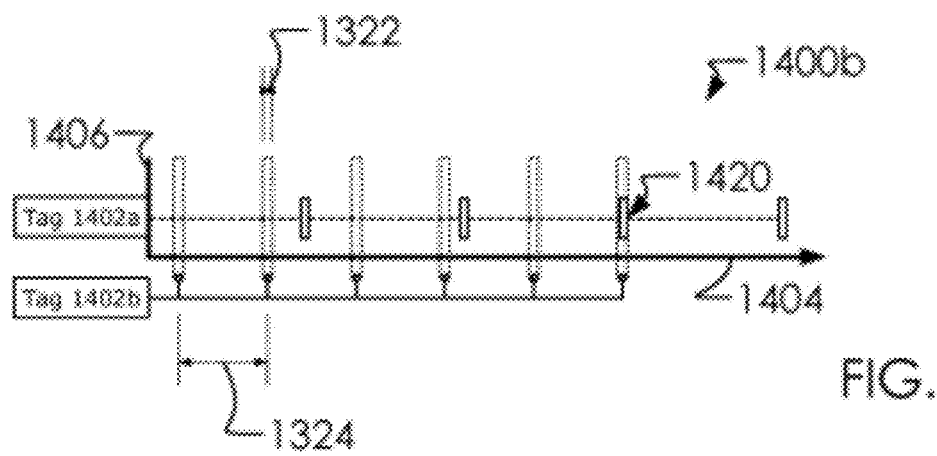

FIGS. 14A and 14B illustrate a first communication timing chart 1400a and a second communication timing chart 1400b.

Figure 15A:
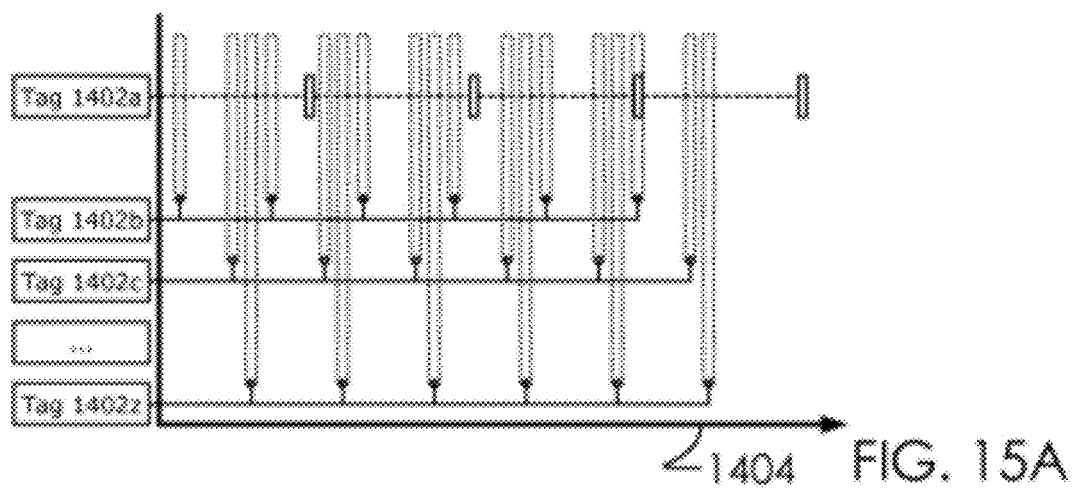
Figure 15B:
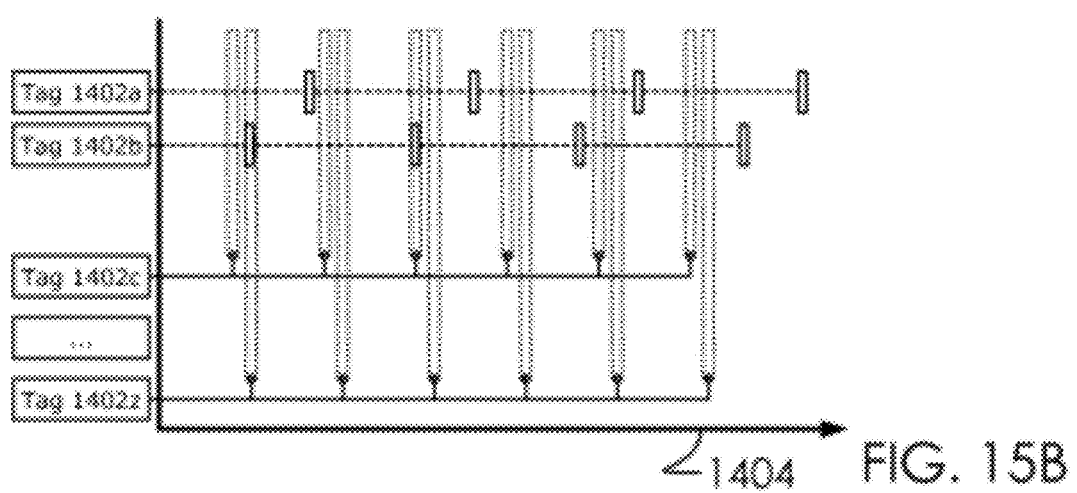
Figure 15C:
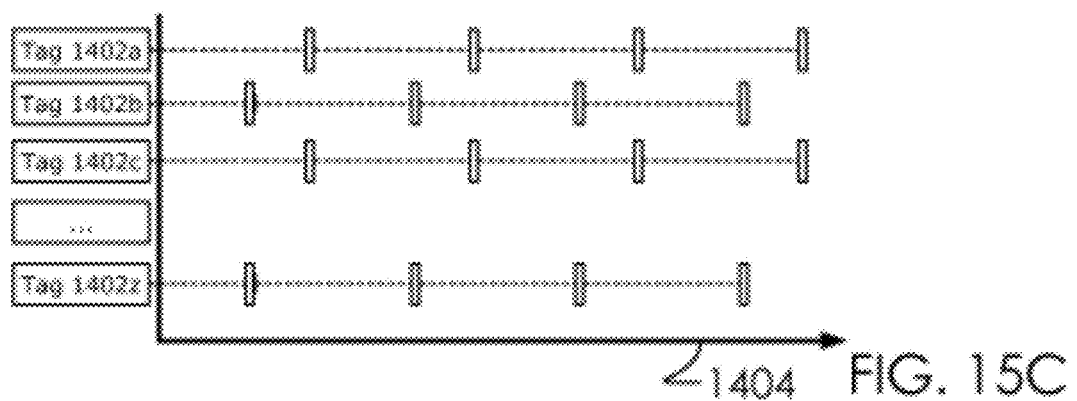
Figure 16A:
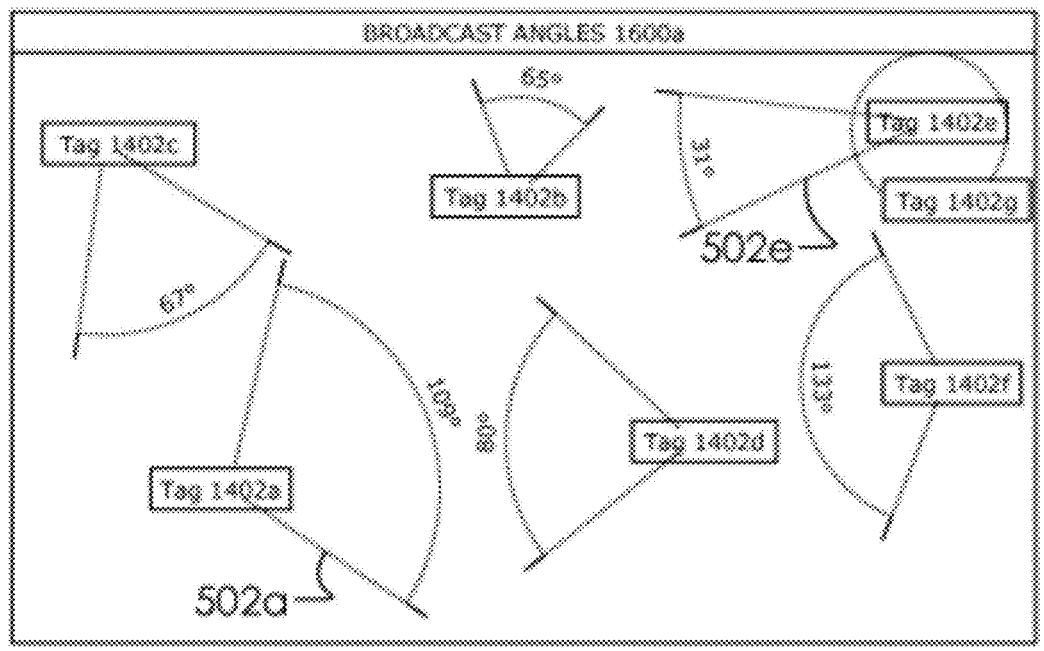
Figure 16B:
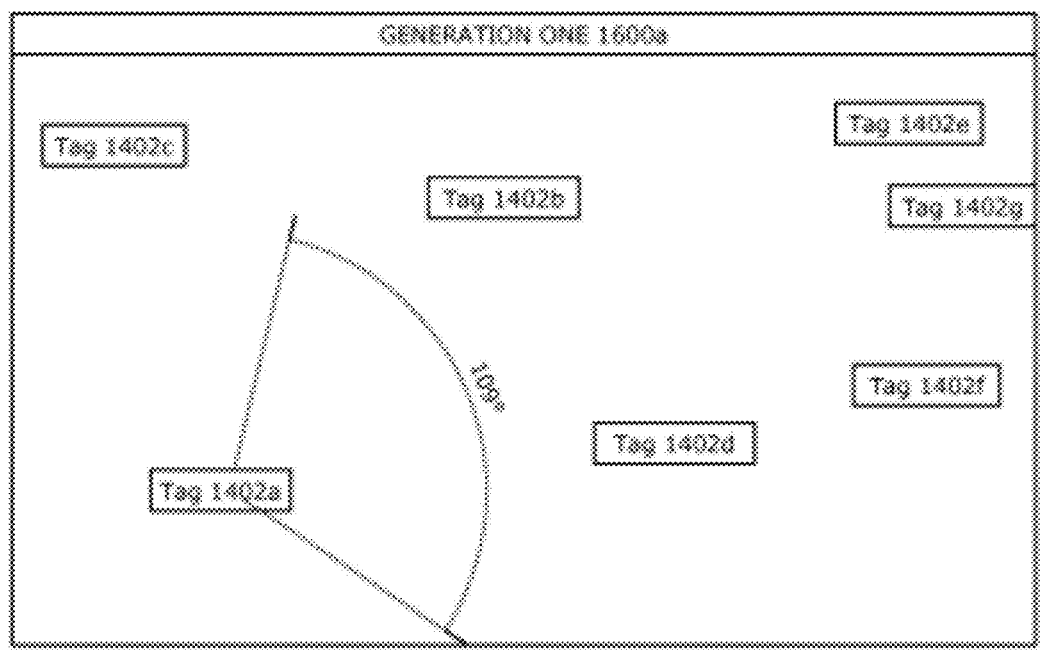
Figure 16C:
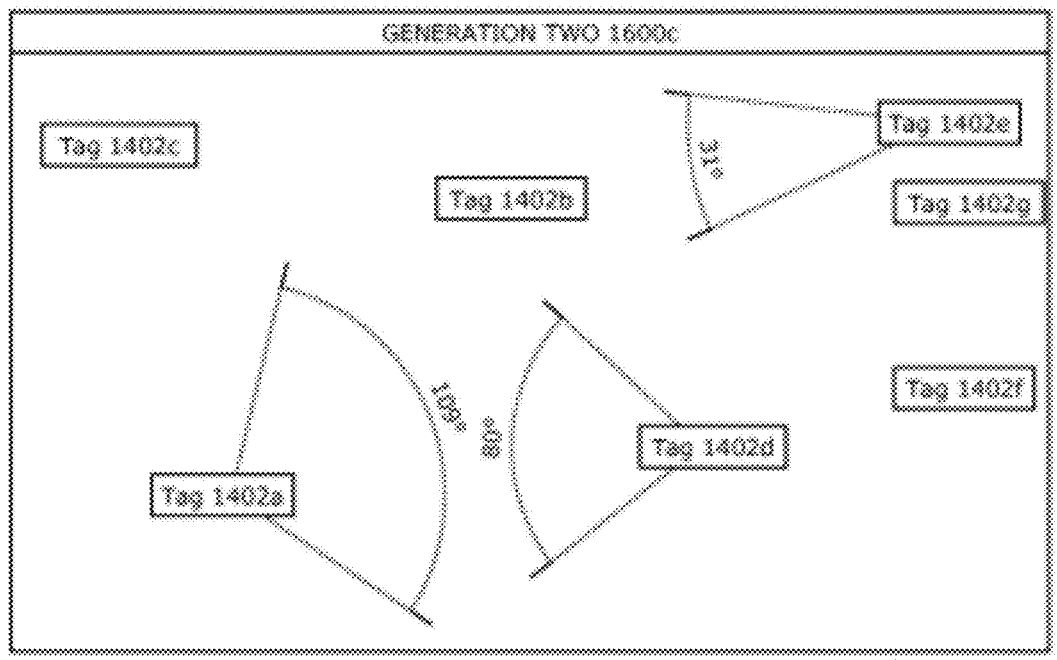
Figure 16D:
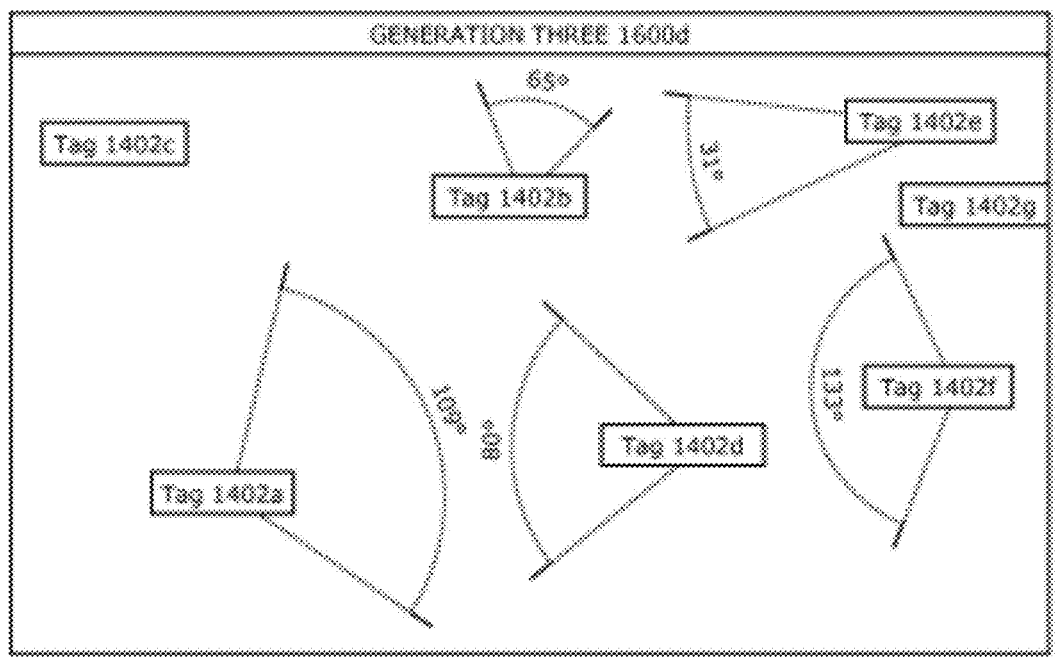

FIGS. 15A, 15B and 15C illustrate a series of exchanges among said plurality of tags with said communications protocol 1300.

FIGS. 16A, 16B, 16C and 16D illustrate a radiation pattern overview 1600a, a first generation broadcast 1600b, a second generation broadcast 1600c, a third generation broadcast 1600d.

Figure 17:
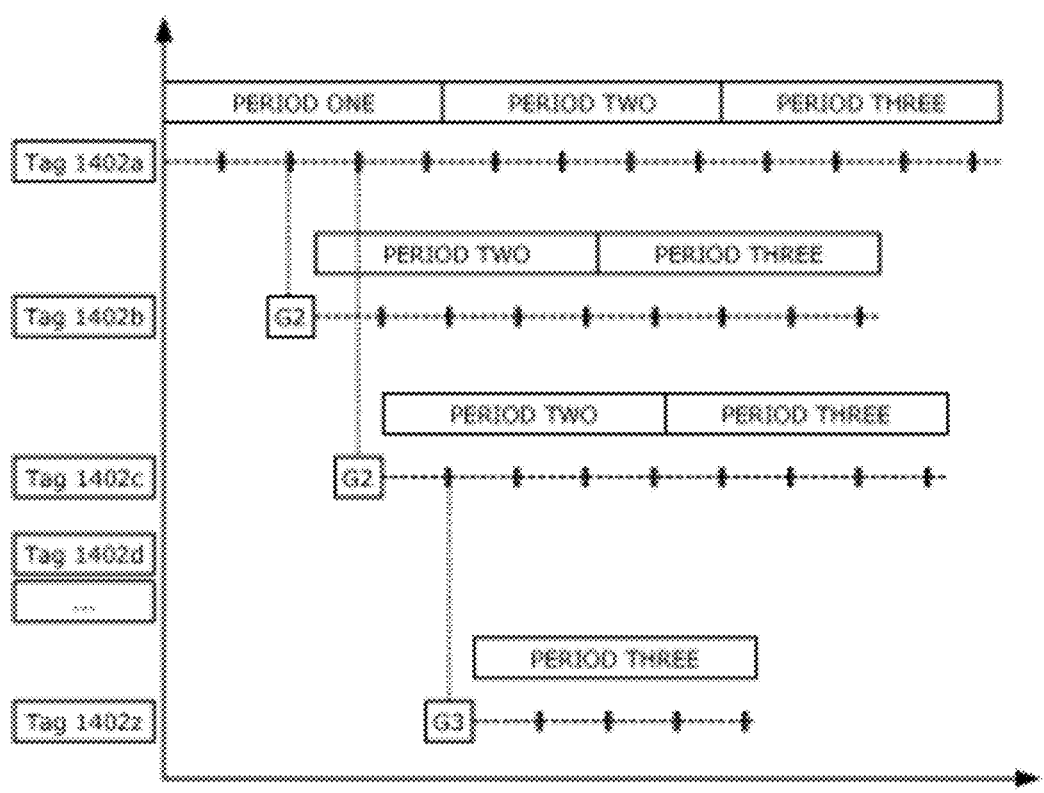

FIG. 17 illustrates a generational broadcast diagram.

DETAILED DESCRIPTION

Described herein is a data management system and method of use. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
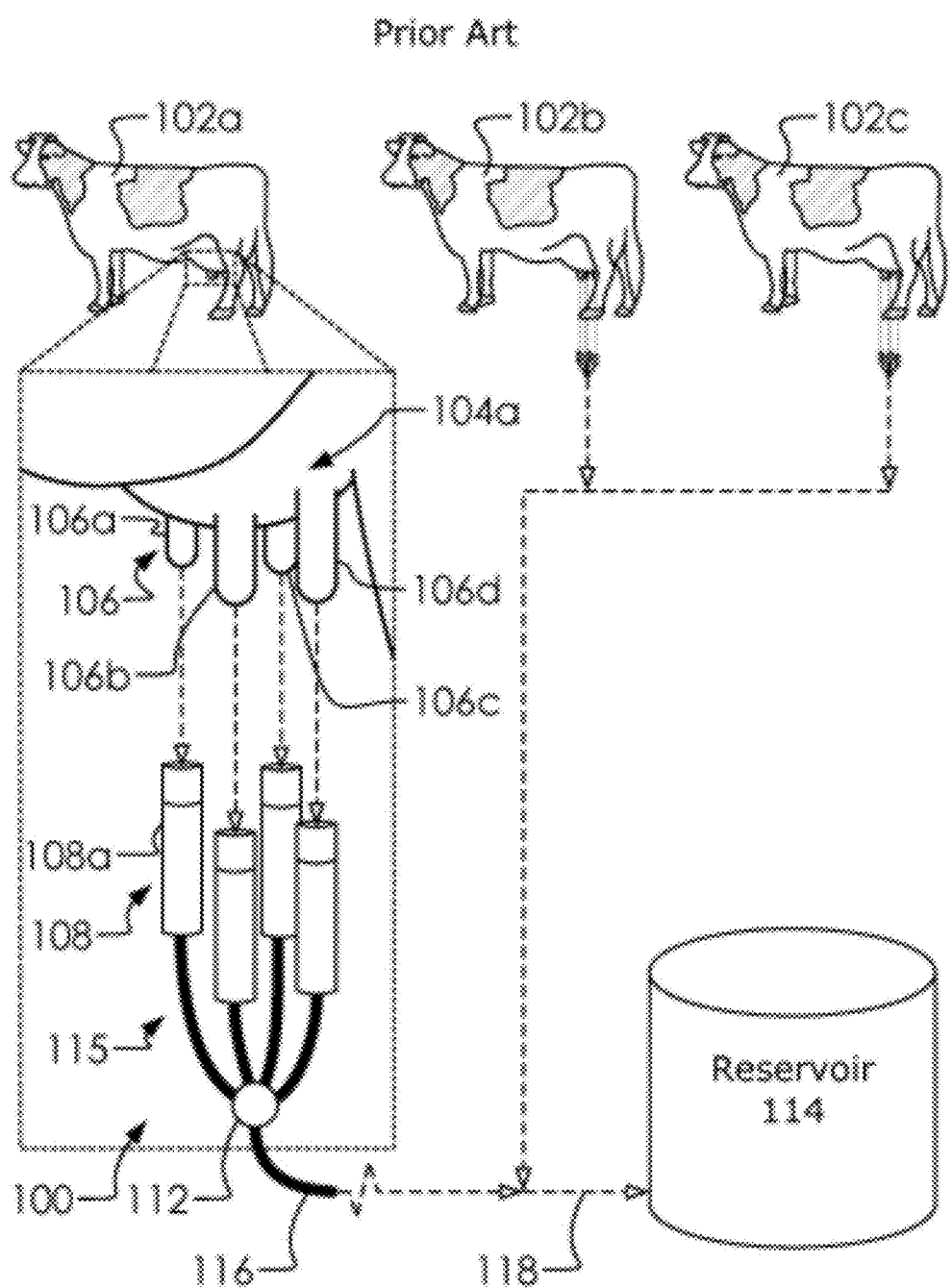
FIG. 1 illustrates a flow diagram of a method of using a first milking system.

FIG. 1 illustrates a flow diagram of a method of using a first milking system 100. In one embodiment, said first milking system 100 can comprise a prior art configuration of said method and arrangement for performing analysis and interrupting the milking by a milking machine. In one embodiment, said first milking system 100 can comprise a system for harvesting a produced milk from a one or more animals (such as a first animal 102a, a second animal 102b and a third animal 102c). In one embodiment, said one or more animals can comprise mammals, such as cows or goats, which bear a harvestable milk. In one embodiment, each of said one or more animals can comprise a plurality of teats 106 (such as a first teat 106a, a second teat 106b, a third teat 106c and a fourth teat 106d). In some cases where said one or more animals comprises a cow, said plurality of teats 106 can be located on an udder, such as an udder 104a of said first animal 102a.

As is known in the art, each of said plurality of teats 106 are extensions of said one or more animals' milk producing glands usually referred to as the "Quarters", each having the milk gland and teat. In a typical bovine milking system, said plurality of teats 106 can be connected to said first milking system 100, at which time said first milking system 100 begins the common and known milk extraction process. In one embodiment, said first milking system 100 can comprise a plurality of teat cups 108 (such as a first teat cup 108a) attached in fluid connection between said plurality of teats 106 and a claw 112. In one embodiment, said claw can be in fluid connection with a reservoir 114. Likewise, each of said one or more animals can be similarly attached to one of said first milking system 100 (such as a system 100b and a system 100c, as illustrated). Consequently, said first milking system 100 can collect a produced milk from said one or more animals into said reservoir 114. An issue arises in the prior art, such as said first milking system 100, in that fluids produced by said first milking system 100 are not tested for each of said plurality of teats 106. One objective of the one or more inline analyzers 200 is to improve testing and production of fluids and to isolate unhealthy fluids, as described below. Another objective is to isolate which among said plurality of teats 106 are producing unhealthy fluids and allow the remaining healthy portions of said plurality of teats 106 to continue producing fluids.

Known machines have been created to interrupt the flow of milk fluids during the milking process of a livestock animal (which can comprise of the bovine or goat species). The purpose or intent of such machines is to stop the flow of milk once it is determined that the milk is suspect or problematic.

The typical configuration is to attach a form-fitted milk collector (such as said plurality of teat cups 108) or shroud to each among said plurality of teats 106 of the animal, commonly known generically as a teat cup, each having a source of massage, pressure variations and various techniques for stimulating the production of milk. The shrouds are then attached to at least one hose, the multiplicity of resulting hoses (such as a plurality of teat cup hoses 115) then attached to a collection or mixing connection (such as said claw 112) which intermixes the multiple teat supplies of milk into a common hose 116 or piping, where it is then intermixed with milk from a plurality of producing animals in a shared hose 118, and further merged into a common storage container (such as said reservoir 114), typically in preparation of shipping to processing or market.

A first problem is exposed in the current art when it is observed that produced milk is tested at a time relatively distinct from the time of production. As milk is extracted from the animal, routed through the said collection and piping, it is a common occurrence for the milk to be analyzed using known methods determining if the milk is acceptable for the desired production criteria. Various criteria are used to evaluate the milk properties, such criteria forming the basis of acceptability of the milk as well as the value of the milk.

A second problem is presented in that produced milk is mixed and held in said reservoir 114. In cases where milk from one or more animals is deficient of certain desired characteristics, contains infectious materials, or has other deficiencies, the mixing of the this milk in to a bulk supply can cause extreme degradation in the quality and value of the overall, potentially disqualifying the contents of the entire production lot of milk.

A third problem in the prior art comprises milk testing methods and systems for administering tests of produced milk and/or the Quarters. Prior testing methods comprise including surface contact, infrared, and the like, measuring of tissue temperature of the Quarters, then performing basic measurements of the temperature within intermixed streams of milk. For example, in one embodiment, significant increases in milk temperature may indicate the presence of infection within the milk gland(s). Other prior art and methods indicate various means of measuring the temperature of the milk stream, the glands, and other various strategies of determining if there is present an indication of elevated temperature, thus possible defects in the host animal that might indicate milk quality degradation.

A fourth problem in the prior art can comprise a failure in existing communication protocols for sensor arrays and controllers. In cases contained in prior art and methods, Wi-Fi, Bluetooth, Wireless, Personal Area Network, WPAN and a few other common protocols and methodologies are implemented to facilitate communications between devices, nodes and base stations, all such protocols being of a methodology of existing, common, and otherwise nonspecialized protocols. Discussion of protocols will be picked up again below.

Figure 2:
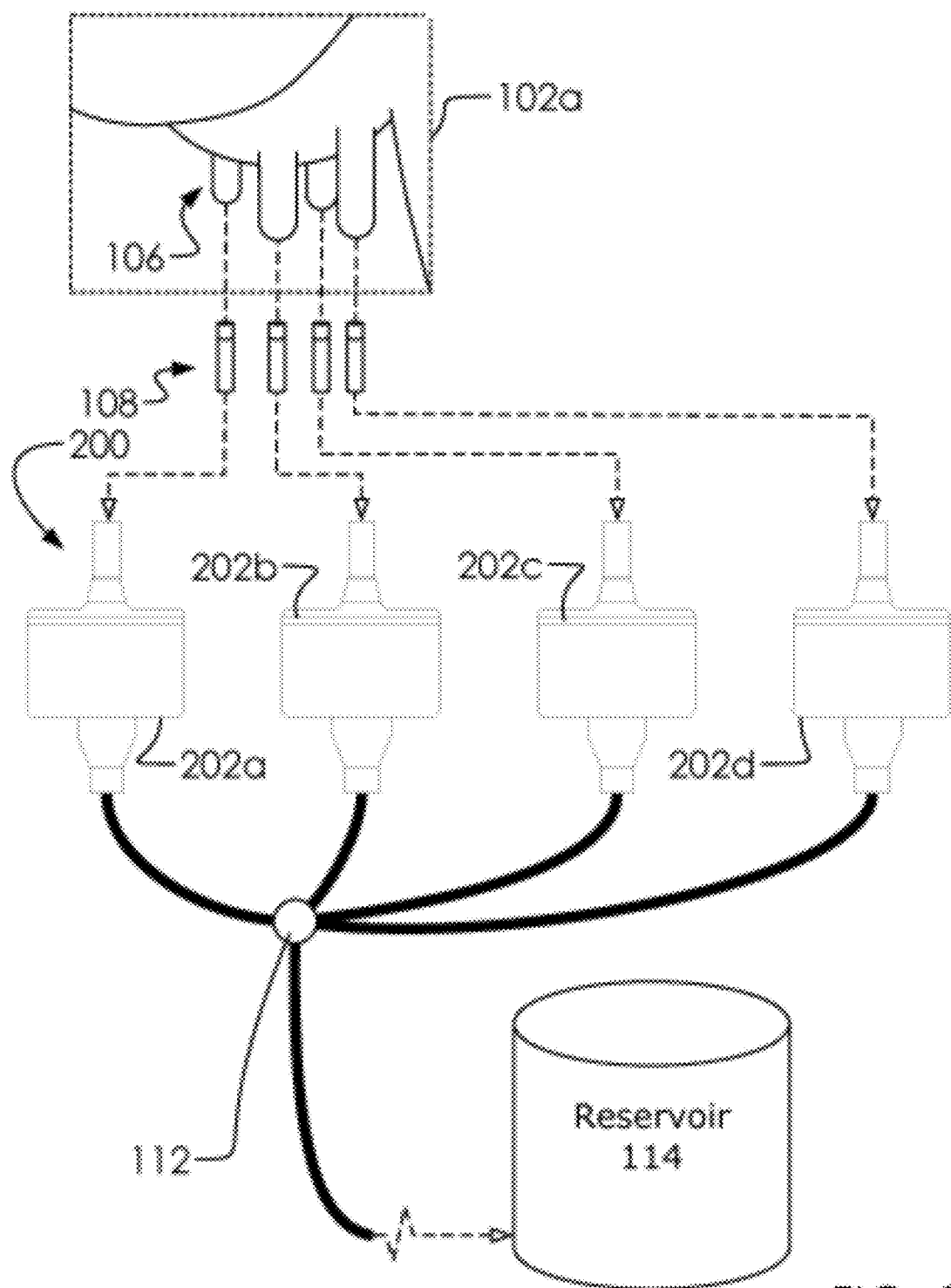
FIG. 2 illustrates a flow diagram of a method of using a one or more inline analyzers 200.

FIG. 2 illustrates a flow diagram of a method of using a one or more inline analyzers 200. In one embodiment, said one or more inline analyzers 200 can replace said first milking system 100, as discussed below. In one embodiment, said one or more inline analyzers 200 can comprise a first analyzer 202a, a second analyzer 202b, a third analyzer 202c and a fourth analyzer 202d. In one embodiment, said one or more inline analyzers 200 can be attached fluidly inline between said plurality of teat cups 108 and said claw 112. For example, in one embodiment, fluid from said first teat 106a can pass through said first teat cup 108a, said first analyzer 202a, and into said claw 112. In one embodiment, said one or more inline analyzers 200 can intercept milk produced by said plurality of teats 106 (that is from each separate quarter) as the milking process commences and is sustained. One objective of this disclosure is to establish that the quick detection of a potential problem and the immediate stopping of the milk flow, from a single teat or a multiplicity thereof, could save immeasurable quantities of waste, corrupted production, and increased profits from producer to market.

Figure 3A:
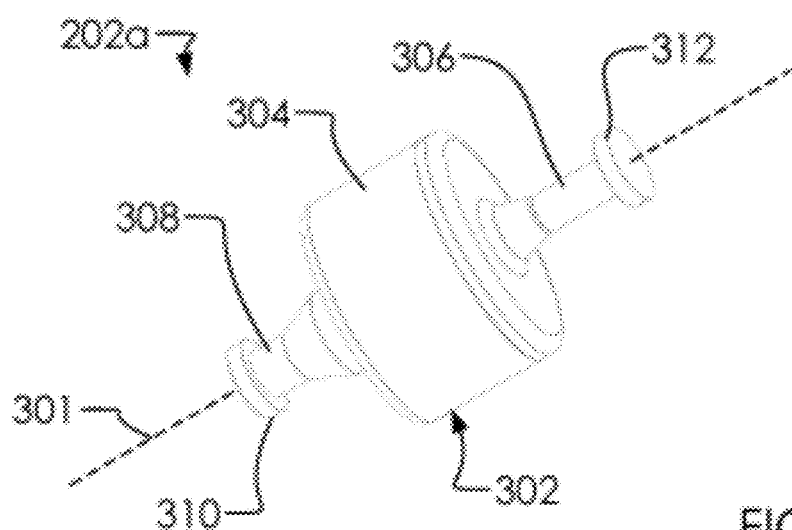
FIGS. 3A, 3B, 3C and 3D illustrate a perspective overview of said first analyzer in various states of disassembly and arranged around a central axis.

FIGS. 3A, 3B, 3C and 3D illustrate a perspective overview of said first analyzer 202a in various states of disassembly and arranged around a central axis 301. FIG. 3A illustrates said first analyzer 202a fully assembled. In one embodiment, said first analyzer 202a can be representative of each of said one or more inline analyzers 200. In one embodiment, said first analyzer 202a can comprise an outer body 302 having a central portion 304, a fluid input channel 306 and a fluid output channel 308. In one embodiment, said first analyzer 202a can further comprise a first cap 312 which can cover said fluid input channel 306 and a second cap 314 which can cover said fluid output channel 308. In one embodiment, said fluid from said plurality of teats 106 and/or said plurality of teat cups 108 can be received through said fluid input channel 306, pass through said outer body 302 and exit said fluid output channel 308.

Figure 3B:
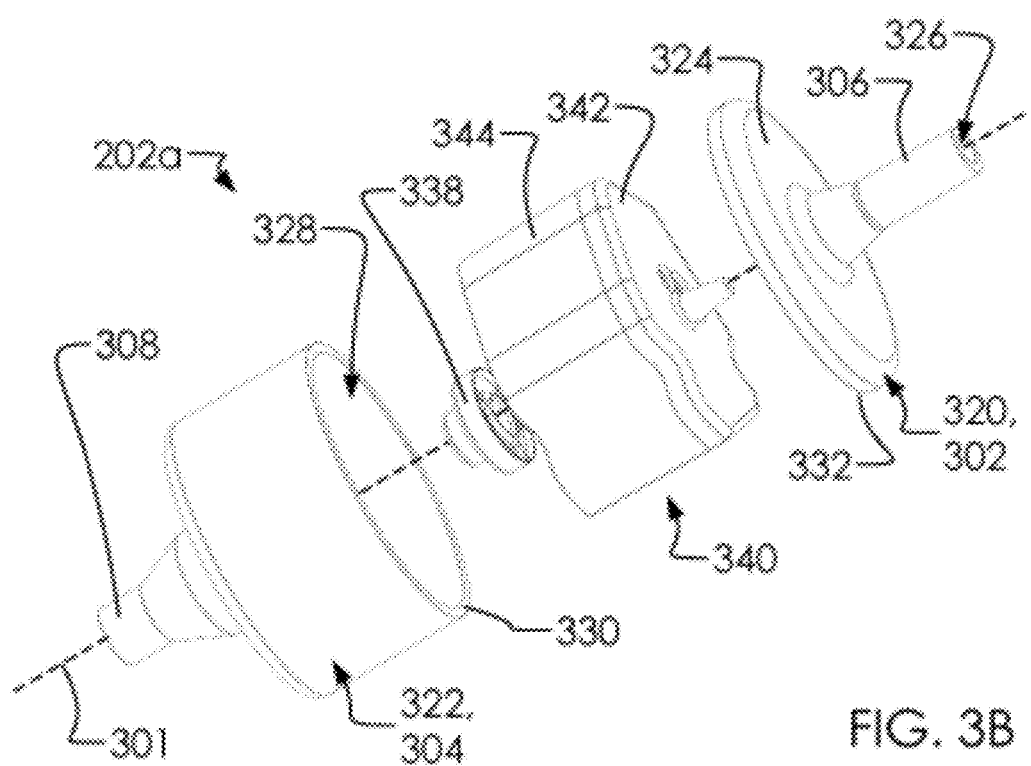

FIG. 3B illustrates said first analyzer 202a in an exploded perspective overview with said outer body 302 disassembled. In one embodiment, said outer body 302 can comprise an upper portion 320 and a lower portion 322. In one embodiment, said upper portion 320 can comprise said fluid input channel 306 and an upper cover 324, as illustrated. In one embodiment, said fluid input channel 306 can comprise a substantially cylindrical body having a hollow central portion 326 about said central axis 301. In one embodiment, said hollow central portion 326 can comprise a substantially round portion of said upper portion 320 capable of mating with a portion of said lower portion 322 and providing a seal between said upper portion 320 and said lower portion 322, as discussed below. In one embodiment, said lower portion 322 can comprise of said central portion 304 and said fluid output channel 308. In one embodiment, said central portion 304 can comprise a substantially cylindrical (and possibly substantially elliptical) portion of said first analyzer 202a, comprising a hollow channel 328 about said central axis 301. In one embodiment, said hollow channel 328 can extend from an upper lip 330 of said central portion 304 and through said fluid output channel 308. In one embodiment, said upper lip 330 of said lower portion 322 can mate with an outer rim 332 of said upper cover 324 in order to form said seal between said lower portion 322 and said upper portion 320. In one embodiment, said first analyzer 202a can further comprise a magnet holder 338 and a float portion 340 which can be contained within said outer body 302. In one embodiment, said float portion 340 can comprise an inner cell cap 342 and an inner cell lower shell 344.

Figure 3C:
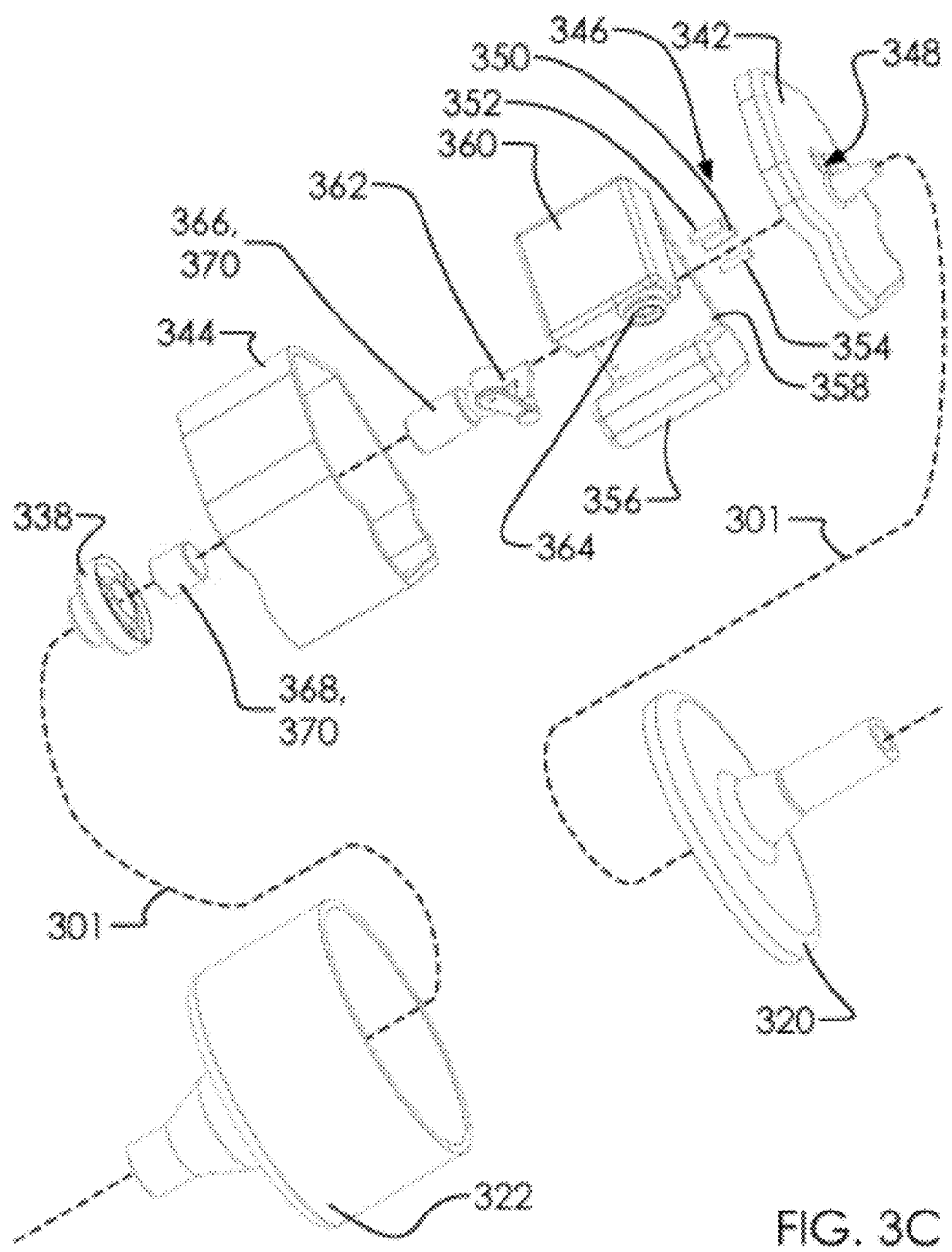

FIG. 3C illustrates a said first analyzer 202a in an exploded perspective overview with said outer body 302 and said float portion 340 disassembled. In one embodiment, said float portion 340 can comprise said inner cell cap 342 and said inner cell lower shell 344. In one embodiment, said float portion 340 can house a one or more electrodes 346. In one embodiment, said one or more electrodes 346 can extend through a one or more apertures 348 in said inner cell cap 342.

In one embodiment, said one or more electrodes 346 comprise a cathode 350, an anode 352 and a readback 354. In one embodiment, said one or more electrodes 346 can perform spectroscopy, "spectrocity", or "spectrotopy" on fluids passing through said first analyzer 202a.

Examples of tests which can be run by said one or more electrodes 346 include: testing for milk infections which can comprise higher impedances than milk without infections; testing for continuity measurements; and measuring mastitis concentrations in the milk; ring back measurements; and/or harmonic measurements. In one embodiment, said one or more apertures 348 can fit tightly around said one or more electrodes 346 so that fluids are not able to seep into said float portion 340.

In one embodiment, said float portion 340 can further house a battery 356, a system-on-a-chip 358 (or "SOC"), a servo base 360, a servo arm assembly 362, a servo drive 364, and a first magnet 366. In one embodiment, said servo drive 364 can attach said servo base 360 to said servo arm assembly 362. In one embodiment, said first analyzer 202a can comprise a magnet assembly 370 comprising of said magnet holder 338, said first magnet 366 and a second magnet 368. In one embodiment, a first portion of said magnet assembly 370 (such as said first magnet 366) can be inside of said float portion 340 and a second portion (such as said second magnet 368 and said magnet holder 338) can be arranged outside of said float portion 340.

Figure 3D:
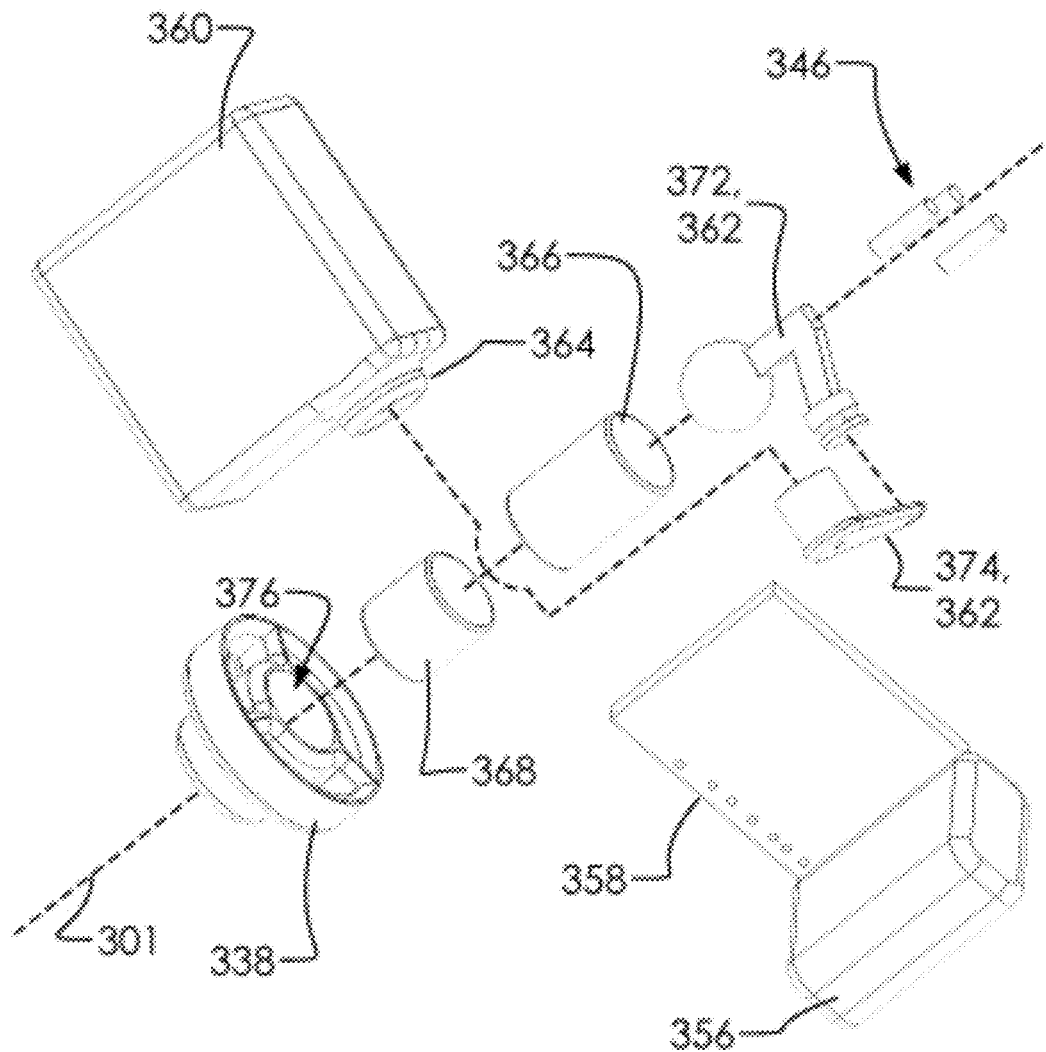

FIG. 3D illustrates an exploded perspective overview several components from within first analyzer 202a without said outer body 302 or said inner cell lower shell 344. In one embodiment, said servo arm assembly 362 can comprise an actuator arm 372 and a servo arm 374. In one embodiment, engaging said servo arm assembly 362 with said servo base 360 can cause said servo arm 374 to press said first magnet 366 substantially along said central axis 301. In one embodiment, moving said first magnet 366 toward said second magnet 368 can cause said second magnet 368 to move substantially along said central axis 301. In one embodiment, said magnet holder 338 can comprise a socket 376 capable of receiving and holding said second magnet 368. Thus, in one embodiment engaging said servo arm assembly 362 can cause said magnet holder 338 to move substantially along said central axis 301.

In one embodiment, said magnet holder 338 can be used for closing and opening a fluid passage through said fluid output channel 308 of said first analyzer 202a. Thus, in one embodiment, said servo base 360, said servo arm assembly 362 and said magnet assembly 370 can be collectively known as a flow regulator, as discussed and illustrated below.

In one embodiment, said first analyzer 202a can use said system-on-a-chip 358 to improve the production and testing of milk by: receiving a one or more signals from said one or more electrodes 346, communicating with others among said one or more inline analyzers 200, communicating with a one or more inline analyzers 200 attached to other animals, communicating with others among said system-on-a-chip 358, and regulating said fluid passage through said magnet holder 338. This will be discussed further below.

In one embodiment, said float portion 340 can comprise an RF transparent material; for example, a non-metallic or semi-metallic material, allowing the passage of RF energy.

FIGS. 4A, 4B, 4C and 4D illustrate said various cross-section views of said first analyzer 202a. FIGS. 4A and 4B illustrate an elevated top view with cut lines and a perspective cross-section overview of said first analyzer 202a. FIGS. 4C and 4D illustrate an elevated front view with cut lines and a perspective lower view of said first analyzer 202a. FIG. 4A comprises a first face 402, a second face 404 and a third face 406, which are cut into said first analyzer 202a as illustrated in FIG. 4B. Likewise, FIG. 4C comprises a fourth face 408 cut into said first analyzer 202a as illustrated in FIG. 4D.

In one embodiment, said first analyzer 202a can receive, analyze and regulate a fluid
(such as milk) by: receiving said fluid into said outer body 302 through said fluid input channel 306; channeling said fluid through said fluid input channel 306 and into said central portion 304 of said outer body 302; analyzing said fluid with said one or more electrodes 346; categorizing said fluid as an acceptable fluid or an unacceptable fluid with said system-on-a-chip 358 in conjunction with readings from said one or more electrodes 346; allowing said acceptable fluid to pass around said float portion 340 within said central portion 304 past said magnet holder 338 and out of said fluid output channel 308; and disallowing said unacceptable fluid from exiting said first analyzer 202a by activating said servo arm assembly 362 with said servo base 360, engaging said magnet assembly 370, pulling said float portion 340 toward said magnet holder 338, and holding said float portion 340 against said central portion 304 at a seal 412. In one embodiment, said float portion 340 can be hermetically sealed so that said fluid does not contaminate components therein. In one embodiment, said float portion 340 can comprise a mister 414 proximate said fluid input channel 306; wherein, said mister 414 comprises a cone shaped element capable of forcing an incoming fluid from said fluid input channel 306 to flow down and around itself, and thereby distribute said fluid more evenly within said central portion 304 of said outer body 302.

For illustration, a fluid channel 418 through said first analyzer 202a has been broken down, and illustrated on FIG. 4B, as follows: in one embodiment, said fluid enters into said fluid input channel 306 at a first channel 420, is distributed around said 414 at a second channel 422, wraps around said float portion 340 at a third channel 424, passes said magnet holder 338 at a fourth channel 426, and exits said fluid output channel 308 at a fifth channel 428. In one embodiment, said fluid channel 418 can comprise said first channel 420, said second channel 422, said third channel 424, said fourth channel 426 and said fifth channel 428. FIG. 4D is included to show that said third channel 424 is provided between said float portion 340 and said central portion 304. Note that said servo base 360, said battery 356, said actuator arm 372 and/or said system-on-a-chip 358 are illustrated in this cross section as being solid components, but that this may not be the case in practice, as would be obvious to one of skill in the art.

FIGS. 5A and 5B illustrate an elevated front view and an elevated back view of said system-on-a-chip 358. In one embodiment, said system-on-a-chip 358 can comprise a one or more sensors and electrical components as discussed below. As illustrated in FIGS. 5A and 5B, said system-on-a-chip 358 can comprise a one or more components all included on one chip (or a complete "system-on-a-chip", as the name implies). It would be obvious to one of ordinary skill in the art that said system-on-a-chip 358 can take on a substantially unlimited number of configurations as to where said one or more components are arranged. Accordingly, the illustration here, which varies from those in FIGS. 1-4D, can take on different ornamental characteristics. It will be further obvious to one in the art that the size and characteristics of said system-on-a-chip 358 are decreasing in size at a relatively rapid rate. Accordingly, it would not be an unreasonable assertion that the surface area of said system-on-a-chip 358 can be as little as 4 cm$^2$, though this size is exemplary and should not be considered to be a design requirement as the surface area of said system-on-a-chip 358 can be substantially larger or smaller than this size. Likewise, in the design of said system-on-a-chip 358, the Applicants have taken care to provide sufficient resources at a battery 502 to power said system-on-a-chip 358. As illustrated and used within said first analyzer 202a, said system-on-a-chip 358 can be compact enough to fit within said float portion 340, as illustrated. In one embodiment, said system-on-a-chip 358 can comprise a board 503 which receives and holds a one or more components of said system-on-a-chip 358.

FIG. 5C illustrates a schematic of said system-on-a-chip 358. In one embodiment, said one or more components of said system-on-a-chip 358 can comprise a one or more processors 504, a memory 506, a communication hardware 508, a COMM system 510, a one or more LEDs 512, and a power system 514. In one embodiment, functionality of said system-on-a-chip 358 can be extended by attaching a one or more sensors 518 to said COMM system 510. In one embodiment, said one or more sensors 518 can comprise a thermo sensors 520, a spectroscopic sensors 522, a respiration sensors 524, a heart rate sensors 526, an accelerometer sensors 528, a location sensors 530, a flow rate sensors 532, a blood pressure sensors 534, and/or an acoustic sensors 536. One example of attaching one of said one or more sensors 518 to said system-on-a-chip 358 can comprise said one or more inline analyzers 200 which comprise said system-on-a-chip 358 attached to said one or more electrodes 346 which can serve as spectroscopic sensors 522.

In one embodiment, said one or more processors 504 can comprise ARM, x86 or other processors capable of receiving one or more data and one or more instructions, and returning a calculated result, as is known in the art. In one embodiment, said memory 506 can comprise a RAM or a ROM memory. In one embodiment, said communication hardware 508 can comprise a Wi-Fi (802.11 type) antenna, a Bluetooth, a NFC, an IR, or similar communication system, as is known in the art. In one embodiment, said one or more LEDs 512 can comprise a one or more lights attached to or integrated into said system-on-a-chip 358 on said board 503. In one embodiment, said power system 514 can comprise a system for managing a power source which can be attached to said system-on-a-chip 358 or external to it, such as said battery 502, said battery 356 or an external battery 538.

FIG. 6 illustrates a first network diagram 600 of using said system-on-a-chip 358. In one embodiment, a plurality of said system-on-a-chip 358 (hereafter a "plurality of SOCs 620") can be used simultaneously on said first network diagram 600, such as a first SOC 358*a*, a second SOC 358*b*, a third SOC 358*c*, a fourth SOC 358*d* and an intermediate SOC 358*x*. In one embodiment, a feature of said plurality of SOCs 620 can comprise an improved protocol which can be executed in said one or more processors 504 of said plurality of SOCs 620 for collecting, communicating and diagnosing the health of one or more subjects to which said plurality of SOCs 620 are attached. In one embodiment, said improved protocol can overcome shortcomings of communications standards previously known in the art. In one embodiment, said first network diagram 600 can be described as follows: said first SOC 358*a* can be at a first location 603*a*; said second SOC 358*b* can be at a second location 603*b*; said third SOC 358*c* and said fourth SOC 358*d* can be at a third location 603*c*; said intermediate SOC 358*x* can move between said first location 603*a*, said second location 603*b* and said third location 603*c*; and a server 608 and a data storage 610 can be within data communication with said first network diagram 600. In one embodiment, said first network diagram 600 can further comprise a user device 612 which communicates with said intermediate SOC 358*x* and/or said server 608. In one embodiment, said first location 603*a*, said second location 603*b* and said third location 603*c* can be at a distance from one another measured by a range of said communication hardware 508 of said plurality of SOCs 620, or at a greater distance altogether. In one embodiment, said intermediate SOC 358*x* can roam between said first location 603*a*, said second location 603*b* and said third location 603*c* at regular and/or irregular intervals. In one embodiment, said user device 612 can comprise a tablet computer, a PC, a Mac, a smart phone, or similar, as is known in the art. In one embodiment, said first network diagram 600 need not have said server 608 in communication with said data storage 610. In another embodiment, said first network diagram 600 may have a plurality of each of said server 608 and/or said data storage 610. In one embodiment, the location of said user device 612 and/or said server 608 can be unimportant provided they are in data communication (LAN, WAN, etc.) with the rest of said first network diagram 600. In one embodiment, said data storage 610 can reside within said server 608 and in another embodiment said data storage 610 can be at a remote location.

FIGS. 7A, 7B, 7C and 7D illustrate a data flow diagram for said first network diagram 600 of said plurality of SOCs 620. In one embodiment, said first SOC 358*a* can comprise a memory 506*a* and a communication hardware 508*a*; said second SOC 358*b* can comprise a memory 506*b* and a communication hardware 508*b*; said third SOC 358*c* can comprise a memory 506*c* and a communication hardware 508*c*; and said intermediate SOC 358*x* can comprise a memory 506*x* and a communication hardware 508*x*.

In one embodiment, said first SOC 358*a* can generate a first report 702*a* and said second SOC 358*b* can generate a second report 702*b*. In one embodiment, said first report 702*a* and said second report 702*b* can comprise an alert signal calculated by said one or more processors 504 of said plurality of SOCs 620 based on inputs and thresholds set according to each of said one or more sensors 518. In one embodiment, said third SOC 358*c* can broadcast a clear signal 722, which is generated by said third SOC 358*c* to indicate not alert signals are relevant to said third SOC 358*c* or any among said plurality of SOCs 620 which are in communication with said third SOC 358*c*. One example of an alert signal can be illustrated where, in one embodiment, said one or more sensors 518 may read an unsafe condition, report said unsafe condition back to said COMM system 510, which can be calculated as unsafe by said one or more processors 504, and said alert signal can be stored in said memory 506 and communicated out to said first network diagram 600 through said communication hardware 508.

Figure 7A:
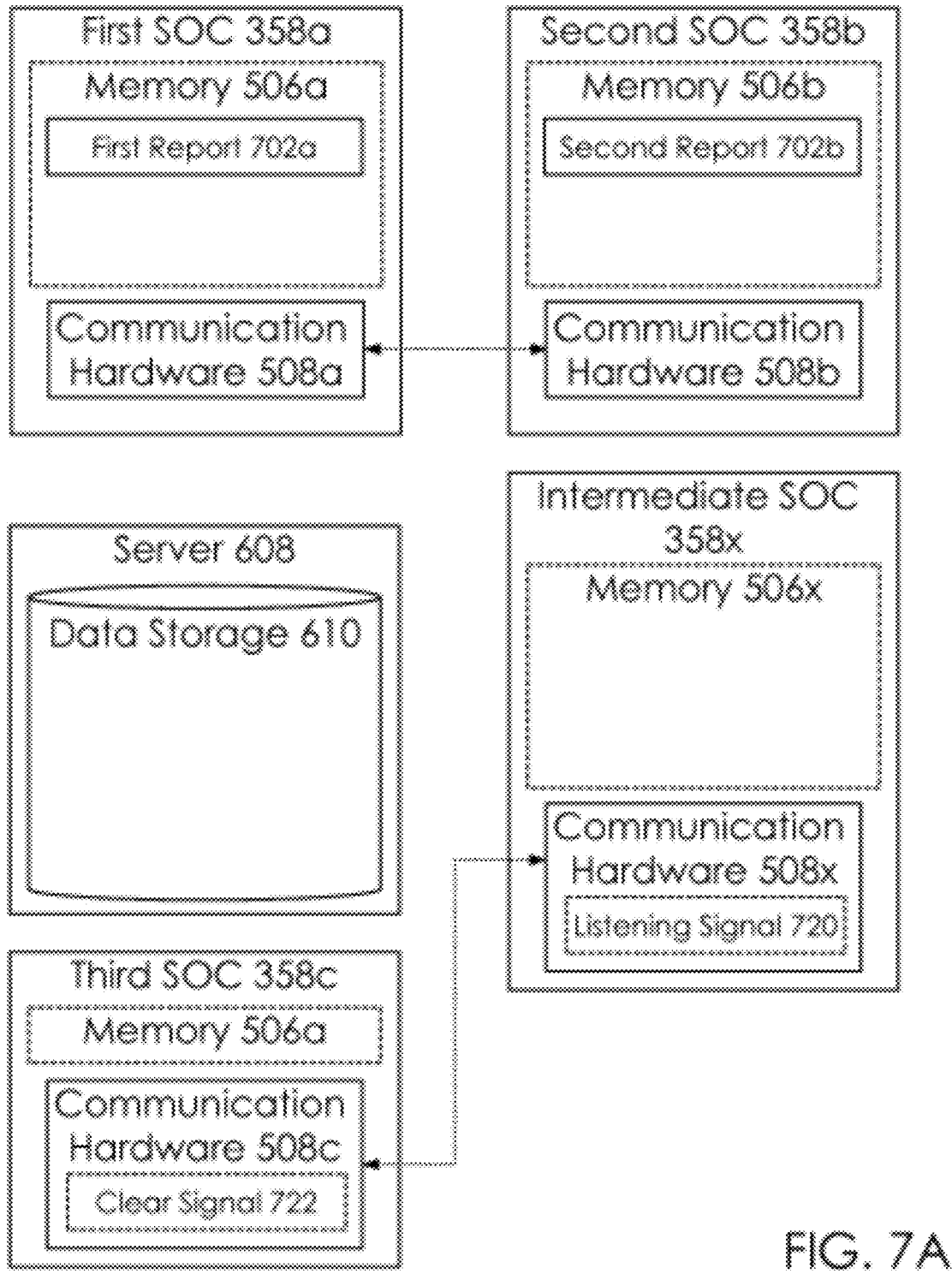
Figure 7B:
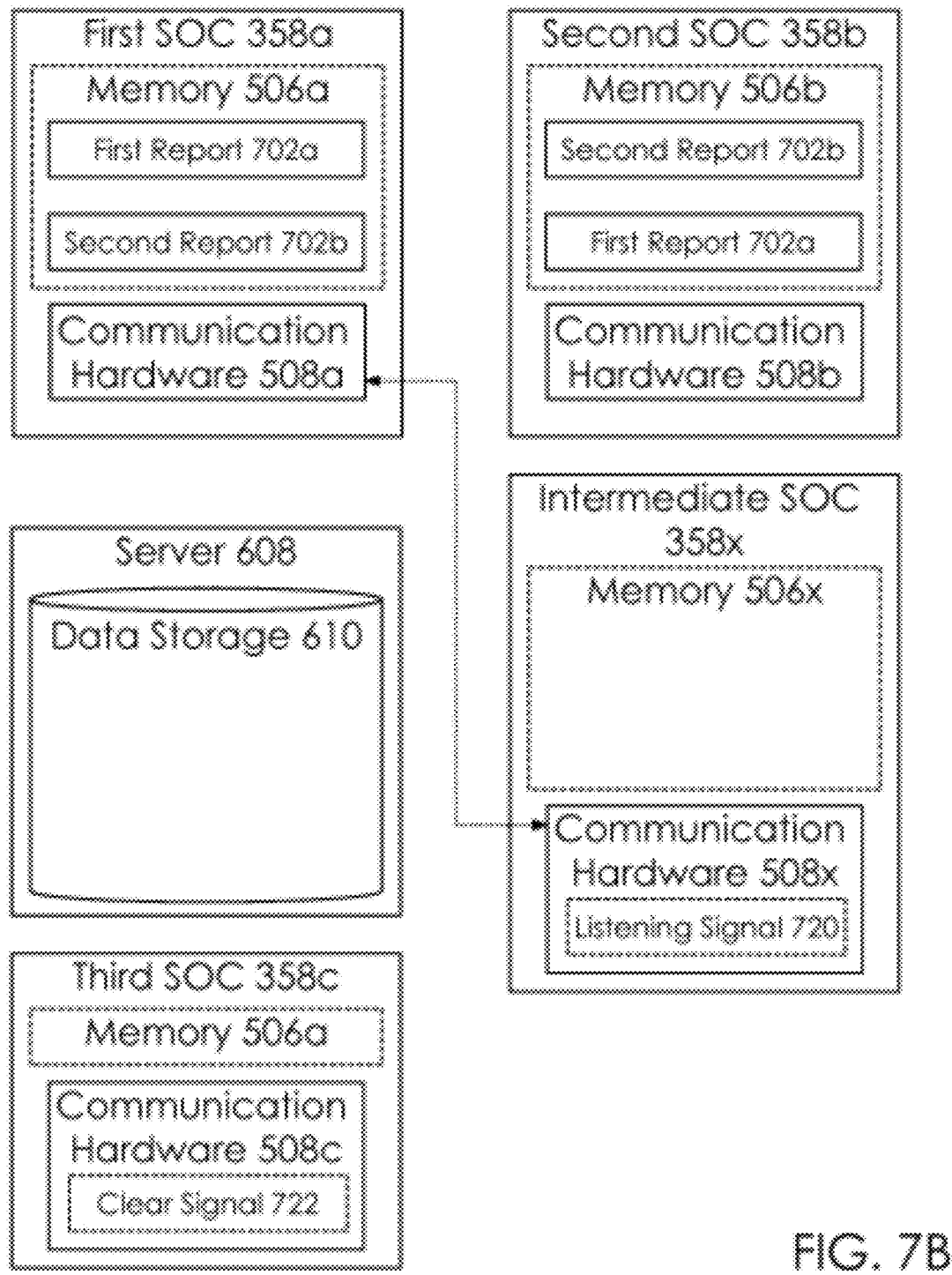
Figure 7C:
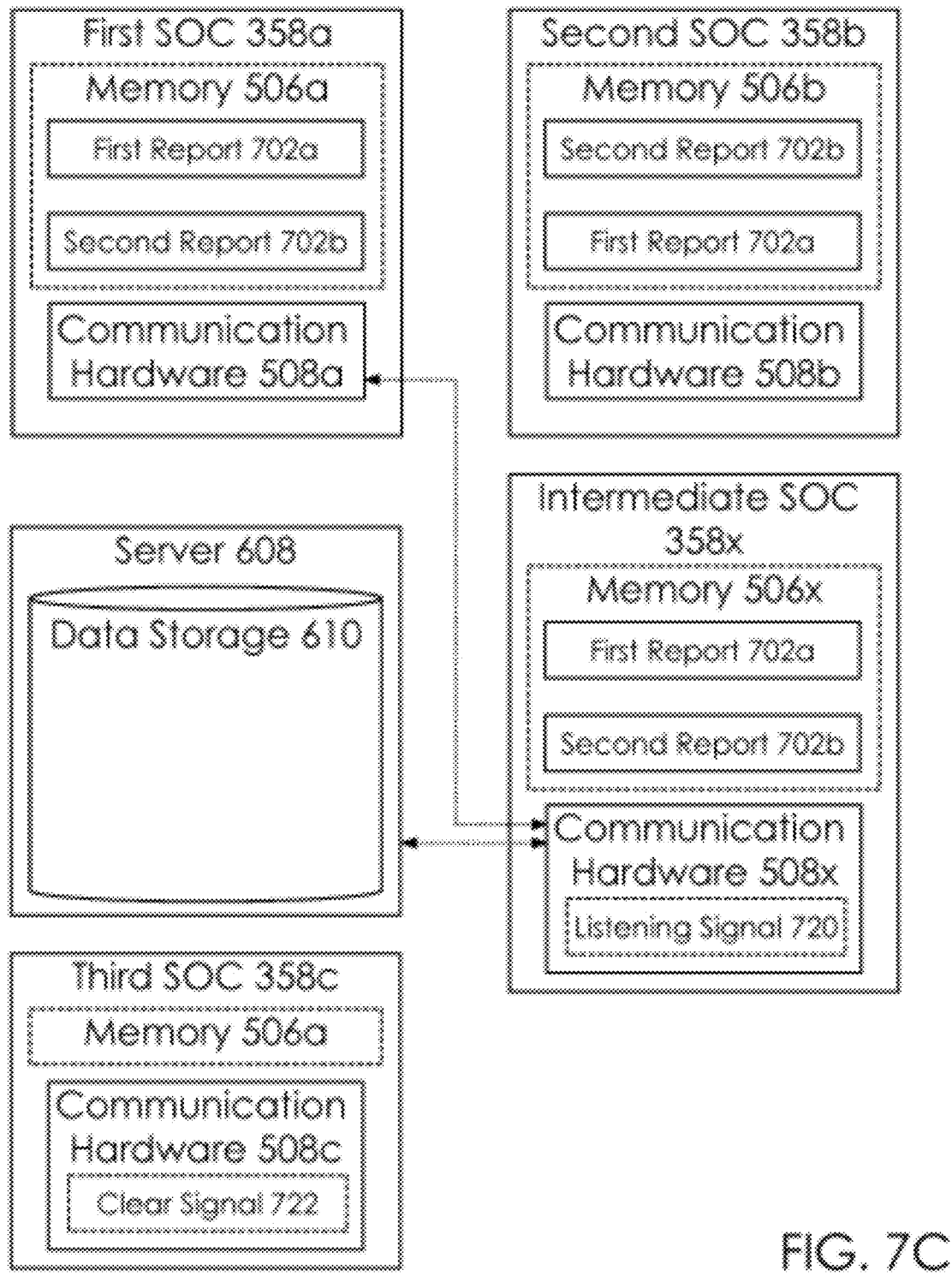
Figure 7D:
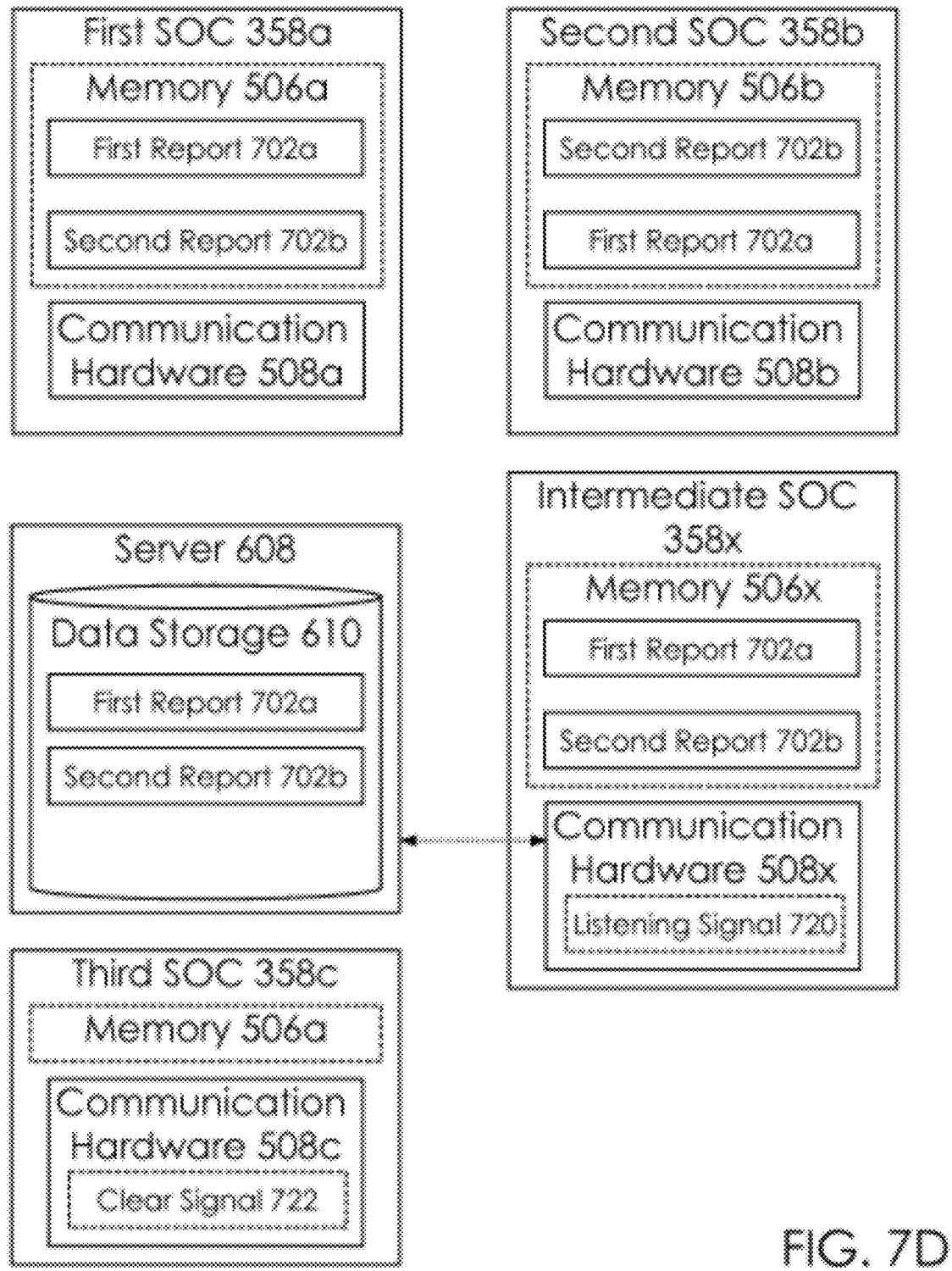

Thus, in one embodiment said first report 702*a* can reside on said first SOC 358*a* and said second report 702*b* can reside on said second SOC 358*b*; and said first report 702*a* can be passed to said second SOC 358*b* and said second report 702*b* can be passed to said first SOC 358*a*, as illustrated in FIG. 7B. In one embodiment, one among said plurality of SOCs 620 holding said first report 702*a* and/or said second report 702*b* can come into communication with said intermediate SOC 358*x* and/or said server 608; wherein, said first report 702*a* and/or said second report 702*b* can be communicated to said server 608. For example, in one embodiment, said first SOC 358*a*, having said first report 702*a* and said second report 702*b*, can communicate with said intermediate SOC 358*x* and pass the alert signals to said memory 506*x*, as shown in FIG. 7C. Finally, said first report 702*a* and said second report 702*b* can be passed to said server 608, as illustrated in FIG. 7D, from said data storage 610 a signal can be passed to said user device 612 or logged in said data storage 610, according to a user preference.

FIGS. 8A and 8B illustrate an elevated front view of an ear tag monitoring system 802 comprising a fifth SOC 358*e*, and an elevated front view of said ear tag monitoring system 802 attached to said first animal 102*a*. In one embodiment, said ear tag monitoring system 802 can attach to an ear of said first animal 102*a*, which can comprise a bovine, and monitor a one or more biological conditions 820 of said first animal 102*a*. In one embodiment, said ear tag monitoring system 802 can comprise a probe 804 and an ear clip 806. In one embodiment, said one or more biological conditions 820/can comprise a heart rate 822, a blood 02 sensor 824, a temperature 826, and similar. In one embodiment, said probe 804 can be inserted into an ear canal of said first animal 102*a*, as is known in the art, for measuring an internal bodily condition of said first animal 102*a*. In one embodiment, said probe 804 can be attached to said fifth SOC 358*e* as discussed and illustrated in FIG. 5C, above.

For illustrative purposes, one or more graphs have been provided to illustrate said one or more biological conditions 820; however, no graphical visual output of said plurality of SOCs 620 is required. For ease of illustration, said one or more graphs provided have a maximum line 830, a minimum line 832, and a reading over time line 834, as would be obvious to one of ordinary skill in the art. Further, although said plurality of SOCs 620 are capable of receiving readings from a wide range of said one or more sensors 518, discussion as follows will centralize on temperature measurements. This approach is not taken to limit the range of abilities of said plurality of SOCs 620 but only to simplify discussion. It would not take unnecessary experimentation by one of the art to extrapolate conclusions made on the basis of a temperature sensor to that of heart rate. Nor is it beyond a person of ordinary skill in the art to attach one of said one or more sensors 518 in place of said thermo sensors 520 of said probe 804.

FIGS. 9A and 9B illustrate a first and second embodiment of a schematic of said one or more inline analyzers 200 and said ear tag monitoring system 802 attached to said first animal 102*a*. In one embodiment, a portion among said plurality of SOCs 620 can all be monitoring the same animal, such as said first animal 102*a*. In one embodiment, said one or more inline analyzers 200 can comprise one among said plurality of SOCs 620 in each of said one or more inline analyzers 200; for example, said first analyzer 202*a* can comprise a first SOC 900*a*, said second analyzer 202*b* can comprise a second SOC 900*b*, said third analyzer 202*c* can comprise a third SOC 900*c*, said fourth analyzer 202*d* can comprise a fourth SOC 900*d*, and said ear tag monitoring system 802 can comprise a fifth SOC 900*e*. In one embodiment, said first SOC 900*a* can comprise a temperature reading 902*a*, said second SOC 900*b* can comprise a temperature reading 902*b*, said third SOC 900*c* can comprise a temperature reading 902*c*, said fourth SOC 900*d* can comprise a temperature reading 902*d*, and said fifth SOC 900*e* can comprise a temperature reading 902*e*. In one embodiment, said one or more inline analyzers 200 can analyze a temperature of a milk from said first animal 102*a* and said ear tag monitoring system 802 can analyze an internal temperature of said first animal 102*a*, and said plurality of SOCs 620 can compare all readings concerning said first animal 102*a* to determine a health state of said first animal 102*a*. For example, in one embodiment, there can be a direct correlation with milk temperature and that of said internal temperature of said first animal 102*a*; wherein, a variation at any of said one or more inline analyzers 200 and/or said ear tag monitoring system 802 can indicate an unhealthy condition. A first healthy condition would exist when the temperature of said milk is substantially identical at all four teats (or quarters), as illustrated in FIG. 9A. In one embodiment, said one or more inline analyzers 200 and said ear tag monitoring system 802 can be in direct communication and not in need of said server 608 or said user device 612 to provide input. Further, said plurality of SOCs 620 being capable of communicating directly can cause said one or more inline analyzers 200 to pair with said ear tag monitoring system 802 and identify that these devices are attached to said first animal 102*a*.

In one embodiment, one among said one or more inline analyzers 200 and/or said ear tag monitoring system 802 can throw off a data irregularity 904, as illustrated in FIG. 9B. In one embodiment, said data irregularity 904 can cause said second SOC 900*b* to throw an exception flag (such as said first report 702*a*, illustrated in FIGS. 7 A-D). Other exceptions can be thrown where there is a notable difference in the temperature of all four quarters (measured with said one or more inline analyzers 200) against the tympanic temperature (measured at said ear tag monitoring system 802). As illustrated, at the time of said data irregularity 904, said second analyzer 202*b* can be programmed to: shut down, send an alert, and capture a sample of milk at said second analyzer 202*b*, another exception can be thrown where the shape of the transition in said temperature is the same at three of the four quarters; wherein, only one (such as said second analyzer 202*b*) is shut down, and the remaining among said one or more inline analyzers 200 keep running on said first animal 102*a*.

In one embodiment, one or more among said one or more sensors 518 can be implanted into said first animal 102*a*, as is known in the art; for example, an auscultation sensor 910 can be implanted proximate to a left rib cage behind the elbow of said first animal 102*a*, and a bolus sensor 912 can be implanted proximate to a stomach of said first animal 102*a*.

In one embodiment, any and all of said one or more sensors 518 can have one among said plurality of SOCs 620 associated with it. In one embodiment, said plurality of SOCs 620 can communicate with one another with said improved protocol; wherein, no pairing or preambles are required.

In one embodiment, one among said plurality of SOCs 620, which is attached to said first animal 102*a* can be used to be a primary SOC for said first animal 102*a*. For example, in one embodiment, said fifth SOC 900*e* can comprise said primary SOC for said first animal 102*a*; wherein, said fifth SOC 900*e* can communicate with said first SOC 900*a*, second SOC 900*b*, third SOC 900*c* and fourth SOC 900*d* for data related to said first animal 102*a*; thereafter, said fifth SOC 900*e* can have the task of communicating across said first network diagram 600 a summary of events related to said first animal 102*a*.

FIGS. 10A and 10B illustrate an elevated top view and a perspective overview of a one or more animals in a dairy milking system 1000. In one embodiment, said dairy milking system 1000 can comprise a well-known milking system in the art. In one embodiment, said ear tag monitoring system 802 and said one or more inline analyzers 200 using said improved protocol can help to run said dairy milking system 1000 more safely. In one embodiment, said first animal 102*a* can have a first ear tag 802*a*, said second animal 102*b* can have a second ear tag 802*b* and said third animal 102*c* can have a third ear tag 802*c*; wherein, the status of said one or more animals in said dairy milking system 1000 can be tracked by said plurality of SOCs 620 and communicated peer-to-peer with said improved protocol; likewise, the status of milk production for each of said one or more animals can be tracked by said ear tags and communicated over said first network diagram 600 with said improved protocol.

FIGS. 11A and 11B illustrate a perspective overview of a one or more pens 1100 with a one or more animals in a first pen 1100*a* and a second pen 1100*b*. As is known in the art, said one or more animals in one or more pens 1100 are prone to separating into a one or more groups (such as a first group 1102a and a second group 1102b) and into a one or more outliers (such as a first outlier 1104a and a second outlier 1104b). In one embodiment, said first group 1102a can comprise a nearest animal 105 which can be nearest to said first outlier 1104a, as will be discussed below. In one embodiment, said one or more pens 1100 can have a path 1108 proximate to said one or more animals for maintenance and access to said first group 1102a and or said second group 1102b. As discussed above, each among said one or more animals can have one among said plurality of SOCs 620 attached to them by said ear tag monitoring system 802; wherein, each among said ear tag monitoring system 802 can comprise a range 1110 wherein said ear tag monitoring system 802 can communicate with a nearest among said plurality of SOCs 620 on said one or more pens 1100. For example, in one embodiment, said first outlier 1104a can be a first distance 1114 from said nearest animal 1105; wherein, provided said range 1110 is greater than or equal to said first distance 1114, a one or more signals from said first outlier 1104a can be passed back to said plurality of SOCs 620; that is said first outlier 1104a is not in a communication isolation provided it is relatively close to others among said one or more animal. In one embodiment, said plurality of SOCs 620 on said one or more animals can pass a one or more signals along throughout a network (similar to said first network diagram 600) and back to said intermediate SOC 358x which can be occasionally drive or carried past said one or more pens 1100 along a path 1108 in a service vehicle 1112. Thus, in one embodiment said one or more outliers may be scared away by maintenance personnel, but said plurality of SOCs 620 ensure that data related to said one or more outliers are passed to said intermediate SOC 358x nonetheless.

In one embodiment, said range 1110 can be measured by calculating an envelope sync (or "RSI") which is similar to how cell phone systems calculate distances. Animal psychology suggests that behavior exhibited by said one or more outliers may indicate sickness and/or higher risk of sickness; thus, by communicating a location of and condition of said one or more outliers, said plurality of SOCs 620 ensure that a the general health of said one or more animals can be more easily monitored. Likewise, animal psychology suggests that animals that clump together in herds (such as said one or more groups) are more prone to being healthy. Accordingly, knowing the sensor reading on said one or more animals in conjunction with their heard related behavior can communicate more information that merely analyzing a temperature number. In one embodiment, said plurality of SOCs 620 are adapted to collect and analyze heard related behaviors such as relative distances from said one or more groups As illustrated in FIGS. 11A and 11B, said one or more animals are distributed about said one or more pens 1100, it is further understood that said one or more animals are moving about said one or more pens 1100 as time passes. Accordingly, said plurality of SOCs 620 function on a "network" (such as said first network diagram 600) where each animal's movement consists of a router for its neighboring animals. In one embodiment, said plurality of SOCs 620 can communicate to said intermediate SOC 358x, said user device 612 which can be in said service vehicle 1112 and/or said server 608. In one embodiment, said intermediate SOC 358x can collect data from said plurality of SOCs 620 incidentally to said service vehicle 1112 driving down said path 1108 as a matter of daily activities at said one or more pens 1100. In one embodiment, said intermediate SOC 358x can pass data collected at said one or more pens 1100 along to said server 608 at a later time.

Collecting data about a relative location of said one or more outliers can provide value as to which among said one or more animals are shy of said service vehicle 1112 and therefore, possibly, more disturbed emotionally.

By distributing data generation across said one or more pens 1100 on each among said plurality of SOCs 620, a near perfect inventor of said one or more animals can be made. For example, in one embodiment, where said one or more outliers are attempting to hide from said service vehicle 1112, said plurality of SOCs 620 identify said one or more outliers along with all of said one or more animals and pass data related to each animal back to said intermediate SOC 358x. Further, because said one or more animals are substantially in motion at all times, the likelihood that said one or more outliers remain unaccounted for is relatively low.

Since said improved protocol is adapted to fast-coupling COMMS (bypassing traditional hand-shaking and coupling), said plurality of SOCs 620 are adapted to rapid passing of data among said one or more animals. Further, said improved protocol is highly redundant since each of said plurality of SOCs 620 is a different router for communication on and around said one or more pens 1100 (or other multi-node environments). In one embodiment, passing data between proximate nodes among said plurality of SOCs 620 can be referred to as "propagating" data with said improved protocol.

In one embodiment, said intermediate SOC 358x can be attached to a broadcast/mobility type of a data tower, as known in the art, rather than being moved passed said one or more pens 1100 at intervals. This approach may provide more frequent data collection, and may be an excellent approach provides that said one or more animals are within range of said data tower and/or one another. However, infrastructure, such as said data towers can be expensive.

FIGS. 12A and 12B illustrate a perspective overview of an aerial intermediate SOC 1200 and an aerial SOC communication range 1202. In one embodiment, said aerial intermediate SOC 1200 can comprise a remote controlled helicopter, such as an eight bladed (or an octo-copter), a four bladed (or quad-copter) or similar, which is designed to carry said intermediate SOC 358x and to fly above said one or more pens 1100 and collect data from said plurality of SOCs 620. In one embodiment, collecting data from said plurality of SOCs 620 can comprise focusing said aerial SOC communication range 1202 on portions of said one or more animals until all of said one or more animals in said one or more pens 1100 are accounted for. In one embodiment, said aerial intermediate SOC 1200 can be fully or partially automated to fly along a preset route over said one or more pens 1100.

In one embodiment, said aerial intermediate SOC 1200 can be said to make its "rounds" about said one or more pens 1100 at programmable intervals.

In one embodiment, the protocols known in the prior art can typically require various time periods to establish connections or to pair ranging from reasonably short periods up to several clock seconds. Data "packets" must be prepared, then the packets are transmitted to an adjacent node where the data must then be decoded and the packet interpreted. Many protocols must negotiating a "preamble", establish a "handshake", or must "pair" before transmission or reception may occur. All of these techniques require valuable time that may not be available within a heard of moving animals. It can be difficult to broadcast to a multiplicity of nodes, or to receive data from the same, with these protocols since some type of logical handshake is usually required.

The ISOCHRONOUS (ISOC) format, heretofore known as said improved protocol, for data communications is a procedure or protocol in which each information character or "byte" is individually synchronized by the use of start and stop encoding elements, also referred to as "start bits" and "stop bits." In the ISOC transmission format, each byte is framed as a separate and independent unit of data that may be transmitted and received at irregular and independent time intervals. The characters or bytes may also be transmitted as a contiguous stream or series of characters, but in either case, preparation of a data transmission or the receiving of data occurs in an extremely short time period, typically in the sub-second range.

ISOC transactions differ in many ways from other transactions. ISOC endpoints produce or consume a continuous, real-time stream of data. On full-speed ISOC devices, exactly one packet is transferred in every frame (millisecond or less). For high-speed, the interval of packets can be a series of micro-frames. High-speed devices also support sending up to three physical packets per interval as one large logical packet without negotiating a preamble, handshake, or pairing.

ISOC transmitters may or not establish two-way communications with one or more adjacent nodes, depending on the desired mode of communications. One node may broadcast a data message to one or a multiplicity of listening nodes without establishing a handshake or preamble or being known or recognized by the transmitting node. This transmission can range from one byte to a "file transmission" wherein a large stream of data is transmitted at once. One node may broadcast a data byte or stream to one to thousands or more nodes which will be able to receive the data concurrently.

In such an event as physical distance prohibits the reception of the broadcast to be received, listening nodes may subsequently repeat received data or files forming an Ad-Hoc, NodeChain, or Mesh network topology which exists only for the period of time in which the data is being transmitted. Multiple known companies have produced ISOC transceivers and software for various applications where fast-turnaround communications are desirable.

Another large challenge in creating sensor instruments is the space, complexity and economic costs of creating instruments requiring small, embedded circuits that are compact enough for fitting to many of the desired physical formats for tympanic ear-mounted sensors, heart, organ, or lung acoustic on-dermal sensors, adhesive-mountable or hand-held auscultation sensors, vaginal implants, adhesive mounted or implanted boluses for chemical, movement, acoustic, spectroscopy, and like sensory devices, capable of long-term use, which are of applicable physical size and minimal weight to allow prolonged attachment of the embodiments to the animal.

In traditional construction and layout, many components of a sensory circuit are distinct "entities" or packages and are usually constructed as a series of separate components and microchips arranged onto a circuit board. With System-on-Chip (SoC) technology, components can be stacked on top of each other or otherwise located on the same substrate (chip) in what is called "bare die" form. Recent introductions and refinements in SoC architecture allows for small, single-chip component form factors which contain such processing and peripheral devices such as MCUs, CPUs, amplifiers, analog-to-digital, and digital-to-analog converters, clocks, communications faculties, interfaces such as USB and Ethernet, and other peripheral components which would, using conventional construction, been separate physical components. Using SoS format, collections of peripheral devices, requiring substantial physical area, are incorporated into a single module assuming fractions of the area to facilitate the same electronic functions.

Further, prior attempts at creating a series or network of various devices and device types, implemented intending to collect multiple data types from various measurement sources, then to comprehensively associate these data, have not addressed a standardized methodology which is to allow various types of devices to perform as a coordinated network or information cluster. Finally, it is generally noted that data collected from sensors is usually sent to a network router, hub, or computer node where the collection of information is then evaluated.

FIG. 13 illustrates a work flow diagram of a communications protocol 1300. In one embodiment, said communications protocol 1300 can comprise a broadcasting protocl 1300*a* and a listening protocol 1300*b*. In one embodiment, said broadcasting protocol 1300*a* can comprise a first step 1302*a*, a second step 1302*b*, a third step 1302*c*, a fourth step 1302*d*, and a fifth step 1302*e*; and said listening protocol 1300*b* can comprise a first step 1304*a*, a second step 1304*b*, and a third step 1304*c*.

In one embodiment, said broadcasting protocol 1300*a* can comprise: said first step 1302*a* comprising creating a data payload 1305 for said system-on-a-chip 358; said second step 1302*b* comprising calculating a one or more broadcast conditions 1307 for said data payload 1305; said third step 1302*c* comprising enclosing said broadcast information 1306 with a cycle length 1308 (having a cycle length 1308 and a broadcast length 1310) into a transmission 1312; said fourth step 1302*d* comprising broadcasting said transmission 1312 comprising said 1304/for said broadcast length 1310 one time per each cycle length 1308; said fifth step 1302*e* comprising repeating steps 1302*a*-1302*d* for a given time period 1314 or a given number of cycles 1316.

In one embodiment, said listening protocol 1300*b* can comprise: said first step 1304*a* comprising listening for said transmission 1312 for a given listening period 1322 in a given listening cycle length 1324; said second step 1304*b* comprising either hearing said transmission 1312 or repeating said first step 1304*a*; and said third step 1304*c* comprising rebroadcasting said transmission 1312 according to a transmission guideline 1330.

FIGS. 14A and 14B illustrate a first communication timing chart 1400*a* and a second communication timing chart 1400*b*. In one embodiment, said first communication timing chart 1400*a* can comprise a time-axis 1404 and a list of tags among said plurality of tags along a y-axis 1406.

Focusing on said first communication timing chart 1400*a*, note that said cycle length 1308 can comprise a length of time in which said broadcast length 1310 may be transmitted. Said broadcast length 1310 and said cycle length 1308 may be set randomly so as to ensure random distribution of broadcasts of said transmission 1312.

Focusing on FIG. 14B, in one embodiment, for said transmission 1312 to be heard (by said listening protocol 1300*b*), said broadcast length 1310 of said transmission 1312 must align with said given listening period 1322 of a listening device among said plurality of tags. Since said given listening cycle length 1324 with said given listening period 1322 repeats, it is mathematically likely that said given listening period 1322 and said broadcast length 1310 will eventually line up at a communication intersection 1420; whereupon, said listening device shifts into being a broadcasting device, as discussed below.

FIGS. 15A, 15B and 15C illustrate a series of exchanges among said plurality of tags with said communications protocol 1300. FIG. 15A illustrates said first SOC 1402a broadcasting; FIG. 15B illustrates said second SOC 1402b joining said first SOC 1402a in broadcasting; FIG. 15C illustrates all of said plurality of tags are now broadcasting. These figures are exemplary of how a broadcasting can propagate among said plurality of tags.

FIGS. 16A, 16B, 16C and 16D illustrate a radiation pattern overview 1600a, a first generation broadcast 1600b, a second generation broadcast 1600c, a third generation broadcast 1600d. In one embodiment, said plurality of tags can each comprise a radiation pattern. For example, in one embodiment, said first SOC 1402a can have a first radiation pattern 1602a, and said fifth SOC 1402e can have a fifth radiation pattern 1602e. Likewise, in one embodiment, said plurality of tags can have a close range omnidirectional radiation pattern (such as an omnidirectional radiation pattern 1604e for said fifth SOC 1402e).

In one embodiment, said communications protocol 1300 can comprise a magnitude element which requires that said radiation patterns be directed at one another before a transmission 1312 be transmitted between one another.

Said first generation broadcast 1600b through said second generation broadcast 1600c illustrate a propagation of said transmission 1312 among said plurality of tags whilst taking into account said radiation pattern.

FIG. 17 illustrates a generational broadcast diagram. In one embodiment, said transmission will be propagated along generational breaks, as illustrated. A first among said plurality of tags creates and broadcasts an alarm signal. A second generation among said plurality of tags receives and rebroadcasts said alarm signal from said first among said plurality of tags. A third generation among said plurality of tags receives and rebroadcasts said alarm signal from said second generation among said plurality of tags. In one embodiment, this process of generations reoccur a set number of times. In one embodiment, a flag is set to determine a number of generations among said plurality of tags are to receive and are to rebroadcast said alarm signal.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive.

For example, the above-described embodiments may be used in combination with each other.

Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An inline analyzer for a milking machine system that regulates a flow of a milk from a teat into a reservoir, the inline analyzer comprising:
an outer body having a central axis, a fluid input channel aligned with a central axis, an upper cover attached to the fluid input channel, a central portion aligned with the central axis and attached to the upper cover, a lower portion attached to the central portion, and a fluid output channel aligned with the central axis and attached to the lower portion, wherein the fluid input channel, the central portion and the fluid output channel each have a hollow central channel;
a float portion disposed loosely within the hollow central channel of the central portion such that the float portion is free to move axially along the central axis and the flow of the milk within the outer body passes around the float portion;
one or more electrodes extending through an upper portion of the float portion;
a battery disposed within float portion;
one or more processors disposed within the float portion and electrically connected to the one or more electrodes and the battery;
a memory disposed within the float portion and communicably coupled to the one or more processors; and
an actuator disposed within the float portion and operably connected to the one or more processors, wherein the actuator causes the float portion to move axially along the central axis of the outer body to regulate the flow of the milk through the outer body in response to one or more signals from the one or more processors.

2. The inline analyzer of claim 1, further comprising:
a radio frequency communications hardware disposed within the float portion and communicably coupled to the one or more processors.

3. The inline analyzer of claim 1,
further comprising one or more passages disposed between the outer body and the float portion that allow the flow of the milk into the outer body and around the float portion, and the float is sealed.

4. The inline analyzer of claim 1, wherein:
the one or more signals from the one or more processor control the actuator to selectively open and close of the flow of the milk through the inline analyzer.

5. The inline analyzer of claim 1 wherein the actuator comprises:
a servo base;
a servo arm operably connected to the servo base;
an actuator arm operably connected to a first magnet to move the first magnet axially along the central axis; and
a second magnet disposed within and proximate to the lower portion of the outer body.

6. The inline analyzer of claim 1 wherein:
the float portion is formed of multiple parts and sealed via one or more conventional polymer seals in combination with conventional threads; and
the conventional polymer seals are made via chemical bonding, solvent, adhesive, ultrasonic welding or other known method of joining.

7. The inline analyzer of claim 2, wherein:
the float portion is formed of an RF transparent material.

8. The inline analyzer of claim 1, wherein:
the float portion having a volume containing an air having a specific gravity ranging from 0.35 to 1.55, relative to SAE standard for specific gravity standard measurements, the comparative medium being water.

9. The inline analyzer of claim 1, wherein:
the float portion having a plurality of ribs and/or fins, allowing an axial movement of the float portion within the outer body, and generally causing central axial placement and with loose fit providing free axial movement of the float portion within the outer body.

10. The inline analyzer of claim 1, wherein:
the movement of the float portion is caused by a mechanical induced movement of a first magnet against like poles of a second magnet.

11. The inline analyzer of claim 10, wherein:
the second magnet is permanently mounted to a lower-inside position in the outer body; and
the first magnet is loosely contained within a guide fixture or geometry within the float portion.

12. The inline analyzer of claim 10, wherein:
the first and second magnets comprise a mag value;
the mag value is actuated by electro mechanical movement of the actuator; and
a channel between the outer body and the float portion is closed via a secondary response caused by the forcing together of the magnets being two like-poled or known magnetic apparatus, or mechanical near-distance separation of the magnets being two opposite-poled.

13. The inline analyzer of claim 1, wherein:
a channel between the outer body and the float portion is closed via a mechanical joining feature, having a known liquid-tight seal, respective to the float portion, forming a link for inducing mechanical movement between the float portion and the outer body.

14. The inline analyzer of claim 1, wherein:
the outer body, housing or containing the float portion, having loose fit between an inside surfaces and outer surfaces of the float portion, ample to allow free flow of the milk through the outer body.

15. A milking machine system comprising:
one or more inline analyzers between a teat of an animal and a reservoir;
each inline analyzer comprising:
  an outer body having a central axis, a fluid input channel aligned with a central axis, an upper cover attached to the fluid input channel, a central portion aligned with the central axis and attached to the upper cover, a lower portion attached to the central portion, and a fluid output channel aligned with the central axis and attached to the lower portion, wherein the fluid input channel, the central portion and the fluid output channel each have a hollow central channel,
  a float portion disposed loosely within the hollow central channel of the central portion such that the float portion is free to move axially along the central axis and the flow of the milk within the outer body passes around the float portion,
  one or more sensors positioned to detect one or more biological conditions of the milk or the animal;
  a battery disposed within float portion,
  one or more processors disposed within the float portion, communicably coupled to the one or more sensors and electrically connected to the battery,
  a memory disposed within the float portion and communicably coupled to the one or more processors, and
  an actuator disposed within the float portion and operably connected to the one or more processors, wherein the actuator causes the float portion to move axially along the central axis of the outer body to regulate the flow of the milk through the outer body in response to one or more signals from the one or more processors; and the milking machine system analyzes the milk from the teat of the animal, and selectively disrupts the flow of the milk from a one or more of the one or more teats of the animal.

16. The milking machine system of claim 15, wherein:
the one or more inline analyzers are attached inline between a plurality of teat cups and a claw.

17. The milking machine system of claim 15, wherein:
the one or more inline analyzers are integrated into a claw between a plurality of teat cups and the reservoir.

18. The milking machine system of claim 15, wherein:
a hose from each the plurality of teat cups are attached to the fluid input channels of the one or more inline analyzers; and
another hose from each among the one or more inline analyzers are attached to the claw.

19. The milking machine system of claim 15, wherein:
the one or more sensors comprise an integrated anode and cathode poles,
the integrated anode and cathode poles protruding from the float portion, located within an area of milk flow between the float portion and the outer body, spaced at a prescribed distance facilitating the performing measurements as the milk moves between the float portion and the outer body.

20. The milking machine system of claim 15, wherein:
the one or more sensors comprise an integrated thermistor or thermal probe upwardly mounted on or about a top surface of the float portion then located directly under and in a direct line of fluid flow inward from the fluid input channel, between the float portion and the outer body; and
the thermistor or thermal probe is further positioned to measure a milk temperature prior to significant mechanical contact between the milk and mechanical surfaces that may skew the indication of the milk temperature.

21. The milking machine system of claim 15, further comprising:
a radio frequency communications hardware disposed within the float portion and communicably coupled to the one or more processors; and
the one or more inline analyzers communication with one another or the milking machine system or both using the radio frequency communications hardware.

22. The milking machine system of claim 21, wherein:
the one or more inline analyzers measure a milk temperature of each teat and communicate the milk temperature of its respective milk sample with the other one or more inline analyzers, each comparing its local temperature reading with that of the adjacent, typically three of the one or more inline analyzers.

23. The milking machine system of claim 22, wherein:
the milk temperatures of the respective milk samples from the inline analyzers used to establish a temporary standard temperature for a particular series of milk samples.

24. The milking machine system of claim 22, wherein:
an exception in the milk temperature of one or more milk samples from their respective teats is detected by comparing the milk sample temperatures to one another; and
the exceptions are derived from a comparison of static temperature measurements, trend analysis, or through programmed algorithm residing on one or more of the one or more inline analyzers.

25. The milking machine system of claim 22, wherein:
the milk temperature of independent milk samples from each teat is compared with a measured tympanic, rectal, vaginal, or stomach temperature, hereafter "Body Temperature" or "T(b)" of the same animal; and
the milk temperature are compared to the T(b) temperature for the purpose of analytical comparison in order to establish an accepted or verify an expected standard for a differential temperatures, a temperature offsets, an expected variances between the milk temperature and T(b) or exceptions calculated through programmed algorithm residing on one or more of the one or more inline analyzers.

26. The milking machine system of claim 22, wherein:
an expected normal temperature is derived for adjacent members of a heard.

27. The milking machine system of claim 15, wherein:
a milk being regulated by the one or more inline analyzers may be of varying viscosity or contain semi-solids, prohibiting the complete closure of one or more of the one or more inline analyzers.

28. The milking machine system of claim 27, wherein:
the inline analyzer detects and quickly interrupts a flow of any non-viscous materials.

29. The milking machine system of claim 27, wherein:
in such case that the milk has coagulated or otherwise become semi-solid or has solidified prohibiting physical movement of the float portion, movement of the actuator may be completed without causing excessive electrical load on the electrical or mechanical components within the float portion, thus movement of the actuator may complete without regard for the resultant opening or closing of the inline analyzer.

30. The milking machine system of claim 27, wherein:
operation of the actuator is not determinate nor dependent on the characteristics of the milk or any materials contained therein.

\* \* \* \* \*